(12) United States Patent
Laroia et al.

(10) Patent No.: US 8,190,163 B2
(45) Date of Patent: *May 29, 2012

(54) METHODS AND APPARATUS OF ENHANCED CODING IN MULTI-USER COMMUNICATION SYSTEMS

(75) Inventors: Rajiv Laroia, Basking Ridge, NJ (US); Murari Srinivasan, Somerset, NJ (US); Junyi Li, Bedminster, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1169 days.

This patent is subject to a terminal disclaimer.

(21) Appl. No.: 10/640,718

(22) Filed: Aug. 13, 2003

(65) Prior Publication Data

US 2004/0229625 A1    Nov. 18, 2004

Related U.S. Application Data

(63) Continuation-in-part of application No. 10/324,194, filed on Dec. 20, 2002, now Pat. No. 6,788,963.

(60) Provisional application No. 60/471,000, filed on May 16, 2003, provisional application No. 60/401,920, filed on Aug. 8, 2002.

(51) Int. Cl.
*H04W 72/00* (2009.01)
*H04W 4/00* (2009.01)
*H04B 7/00* (2006.01)
*H04K 1/10* (2006.01)
*H04L 5/12* (2006.01)
*H04J 7/00* (2006.01)

(52) U.S. Cl. ........ 455/450; 455/509; 375/260; 375/281; 370/329; 370/335

(58) Field of Classification Search ............... 370/352, 370/213, 315, 335, 208, 329; 455/450, 509, 455/515, 500, 422.1; 375/260, 261, 264, 375/280–281

See application file for complete search history.

(56) References Cited

U.S. PATENT DOCUMENTS 4,679,244 A    7/1987  Kawasaki et al.
(Continued)

FOREIGN PATENT DOCUMENTS

DE    2330263    1/1975
(Continued)

OTHER PUBLICATIONS

Cover, Thomas, *Broadcast Channels*, IEEE Transactions on Information Theory, IT-18(1):2:14, 1972.
(Continued)

*Primary Examiner* — George Eng
*Assistant Examiner* — Muthuswamy Manoharan
(74) *Attorney, Agent, or Firm* — Sam Talpalatsky; Nicholas J. Pauley; Jonathan T. Velasco

(57) ABSTRACT

Efficient coding and communication is accomplished by transmitting first and second sets of information using a relatively large transmission block including a plurality of minimum transmission units (MTUs), each MTU corresponding to a unique combination of resources. A first set of MTUs is used in conveying the first set of information, the first set including at least a majority of the MTUs in the transmission block. A second set of the MTUs is defined, e.g., selected, for use in conveying the second set of information, the second set of MTUs including less MTUs than the first set and at least some MTUs included in the first set. The first and second sets of information are communicated by transmitting at least some MTUs included in the first and the second sets of MTUs with the corresponding information modulated thereon.

38 Claims, 15 Drawing Sheets

U.S. PATENT DOCUMENTS

| | | | |
|---|---|---|---|
| 4,833,701 A | 5/1989 | Comroe et al. | |
| 4,901,307 A | 2/1990 | Gilhousen et al. | |
| 5,056,109 A | 10/1991 | Gilhousen et al. | |
| 5,095,529 A | 3/1992 | Comroe et al. | |
| 5,128,938 A | 7/1992 | Borras | |
| 5,267,261 A | 11/1993 | Blakeney, II et al. | |
| 5,311,543 A | 5/1994 | Schreiber | |
| 5,325,432 A | 6/1994 | Gardeck et al. | |
| 5,369,781 A | 11/1994 | Comroe et al. | |
| 5,387,905 A | 2/1995 | Grube et al. | |
| 5,420,909 A | 5/1995 | Ng et al. | |
| 5,450,405 A | 9/1995 | Maher et al. | |
| 5,461,645 A | 10/1995 | Ishii | |
| 5,463,617 A | 10/1995 | Grube et al. | |
| 5,465,391 A | 11/1995 | Toyryla | |
| 5,473,605 A | 12/1995 | Grube et al. | |
| 5,491,835 A | 2/1996 | Sasuta et al. | |
| 5,511,232 A | 4/1996 | O'Dea et al. | |
| 5,513,381 A | 4/1996 | Sasuta | |
| 5,542,108 A | 7/1996 | Sasuta | |
| 5,566,366 A | 10/1996 | Russo et al. | |
| 5,590,396 A | 12/1996 | Henry | |
| 5,594,948 A | 1/1997 | Talarmo et al. | |
| 5,610,559 A | 3/1997 | Dent | |
| 5,625,882 A | 4/1997 | Vook et al. | |
| 5,627,882 A | 5/1997 | Chien et al. | |
| 5,634,197 A | 5/1997 | Paavonen | |
| 5,710,982 A | 1/1998 | Laborde et al. | |
| 5,720,455 A | 2/1998 | Kull et al. | |
| 5,771,224 A | 6/1998 | Seki et al. | |
| 5,809,401 A | 9/1998 | Meidan et al. | |
| 5,809,419 A | 9/1998 | Schellinger et al. | |
| 5,815,531 A | 9/1998 | Dent | |
| 5,831,479 A | 11/1998 | Leffel et al. | |
| 5,867,060 A | 2/1999 | Burkett, Jr. et al. | |
| 5,884,196 A | 3/1999 | Lekven et al. | |
| 5,923,651 A | 7/1999 | Struhsaker | |
| 5,982,760 A | 11/1999 | Chen | |
| 5,991,635 A | 11/1999 | Dent et al. | |
| 5,999,818 A | 12/1999 | Gilbert et al. | |
| 6,021,123 A | 2/2000 | Mimura | |
| 6,078,815 A | 6/2000 | Edwards | |
| 6,108,542 A | 8/2000 | Swanchara et al. | |
| 6,108,560 A | 8/2000 | Navaro et al. | |
| 6,125,148 A | 9/2000 | Frodigh et al. | |
| 6,125,150 A | 9/2000 | Wesel et al. | |
| 6,160,791 A | 12/2000 | Bohnke | |
| 6,167,270 A | 12/2000 | Rezaiifar et al. | |
| 6,185,259 B1 | 2/2001 | Dent | |
| 6,222,851 B1 | 4/2001 | Petry | |
| 6,226,280 B1 | 5/2001 | Roark et al. | |
| 6,230,022 B1 | 5/2001 | Sakoda et al. | |
| 6,239,690 B1 | 5/2001 | Burbidge et al. | |
| 6,243,584 B1 | 6/2001 | O'Byrne | |
| 6,259,685 B1 | 7/2001 | Rinne et al. | |
| 6,266,529 B1 | 7/2001 | Chheda | |
| 6,275,712 B1 | 8/2001 | Gray et al. | |
| 6,307,849 B1 | 10/2001 | Tiedemann, Jr. | |
| 6,308,080 B1 | 10/2001 | Burt et al. | |
| 6,321,095 B1 | 11/2001 | Gavette | |
| 6,334,047 B1 | 12/2001 | Andersson et al. | |
| 6,347,081 B1 | 2/2002 | Bruhn | |
| 6,377,803 B1 | 4/2002 | Ruohonen | |
| 6,385,261 B1 | 5/2002 | Tsuji et al. | |
| 6,396,803 B2 | 5/2002 | Hornsby et al. | |
| 6,400,703 B1 | 6/2002 | Park et al. | |
| 6,408,038 B1 | 6/2002 | Takeuchi | |
| 6,442,152 B1 | 8/2002 | Park et al. | |
| 6,456,604 B1 | 9/2002 | Lee et al. | |
| 6,456,627 B1 * | 9/2002 | Frodigh et al. | 370/465 |
| 6,473,624 B1 | 10/2002 | Corbett et al. | |
| 6,496,543 B1 | 12/2002 | Zehavi | |
| 6,498,934 B1 | 12/2002 | Muller | |
| 6,538,985 B1 | 3/2003 | Petry et al. | |
| 6,546,252 B1 | 4/2003 | Jetzek et al. | |
| 6,553,019 B1 | 4/2003 | Laroia et al. | |
| 6,563,881 B1 | 5/2003 | Sakoda et al. | |
| 6,574,211 B2 | 6/2003 | Padovani et al. | |
| 6,587,510 B1 | 7/2003 | Minami et al. | |
| 6,609,008 B1 | 8/2003 | Whang et al. | |
| 6,611,506 B1 | 8/2003 | Huang et al. | |
| 6,657,988 B2 | 12/2003 | Toskala et al. | |
| 6,690,936 B1 | 2/2004 | Lundh | |
| 6,694,147 B1 | 2/2004 | Viswanath et al. | |
| 6,721,289 B1 | 4/2004 | O'Toole et al. | |
| 6,731,939 B1 | 5/2004 | Watanabe et al. | |
| 6,765,893 B1 | 7/2004 | Bayley | |
| 6,788,963 B2 * | 9/2004 | Laroia et al. | 455/574 |
| 6,799,038 B2 | 9/2004 | Gopikanth | |
| 6,801,759 B1 | 10/2004 | Saifuddin | |
| 6,804,521 B2 | 10/2004 | Tong et al. | |
| 6,904,283 B2 | 6/2005 | Li et al. | |
| 6,952,454 B1 | 10/2005 | Jalali et al. | |
| 6,961,569 B2 | 11/2005 | Raghuram et al. | |
| 6,967,937 B1 | 11/2005 | Gormley | |
| 6,978,149 B1 | 12/2005 | Morelli et al. | |
| 6,999,799 B1 | 2/2006 | Almassy | |
| 7,029,511 B2 | 4/2006 | Ichikawa et al. | |
| 7,054,296 B1 | 5/2006 | Sorrells et al. | |
| 7,085,595 B2 | 8/2006 | Kitchin | |
| 7,142,864 B2 | 11/2006 | Laroia et al. | |
| 7,143,299 B1 | 11/2006 | Rubinstein et al. | |
| 7,162,265 B2 | 1/2007 | Ormson et al. | |
| 7,209,524 B2 * | 4/2007 | Chen | 375/295 |
| 7,257,103 B2 | 8/2007 | Yeh et al. | |
| 7,269,145 B2 | 9/2007 | Koo et al. | |
| 7,295,840 B2 | 11/2007 | Ormson | |
| 7,317,750 B2 | 1/2008 | Shattil | |
| 7,318,185 B2 | 1/2008 | Khandani et al. | |
| 7,321,569 B2 | 1/2008 | Takagi et al. | |
| 7,356,103 B2 | 4/2008 | Nishikawa | |
| 7,391,819 B1 * | 6/2008 | von der Embse | 375/295 |
| 7,403,472 B2 | 7/2008 | Okada et al. | |
| 7,411,895 B2 | 8/2008 | Laroia et al. | |
| 7,420,939 B2 | 9/2008 | Laroia et al. | |
| 7,450,926 B2 | 11/2008 | Chang et al. | |
| 7,480,234 B1 | 1/2009 | Hart et al. | |
| 7,512,424 B2 | 3/2009 | Hossain et al. | |
| 7,522,553 B2 | 4/2009 | Kang et al. | |
| 7,522,672 B2 | 4/2009 | Saed | |
| 7,542,437 B1 | 6/2009 | Redi et al. | |
| 7,558,572 B2 | 7/2009 | Anigstein | |
| 7,587,001 B2 | 9/2009 | Hazani et al. | |
| 7,620,021 B1 | 11/2009 | Chen et al. | |
| 7,620,395 B2 | 11/2009 | Yamashita et al. | |
| 7,627,770 B2 | 12/2009 | Jones | |
| 7,652,978 B2 | 1/2010 | Kim et al. | |
| 7,668,573 B2 | 2/2010 | Laroia et al. | |
| 7,720,112 B2 | 5/2010 | Morris | |
| 7,925,291 B2 | 4/2011 | Anigstein et al. | |
| 2001/0031639 A1 | 10/2001 | Makipaa | |
| 2002/0012334 A1 | 1/2002 | Strawczynski et al. | |
| 2002/0031189 A1 | 3/2002 | Hiben et al. | |
| 2002/0077152 A1 | 6/2002 | Johnson et al. | |
| 2002/0090942 A1 | 7/2002 | Karabinis et al. | |
| 2002/0136157 A1 | 9/2002 | Takaoka et al. | |
| 2002/0145985 A1 | 10/2002 | Love et al. | |
| 2002/0172165 A1 | 11/2002 | Rosen et al. | |
| 2003/0037033 A1 | 2/2003 | Nyman et al. | |
| 2003/0053524 A1 | 3/2003 | Dent et al. | |
| 2003/0086379 A1 | 5/2003 | Terry et al. | |
| 2003/0086381 A1 | 5/2003 | Terry et al. | |
| 2003/0152059 A1 | 8/2003 | Odman | |
| 2003/0153344 A1 | 8/2003 | Su et al. | |
| 2003/0232619 A1 | 12/2003 | Fraser | |
| 2004/0062274 A1 | 4/2004 | Hakansson et al. | |
| 2004/0086027 A1 | 5/2004 | Shattil | |
| 2004/0097231 A1 | 5/2004 | Marque-Pucheu | |
| 2004/0100897 A1 | 5/2004 | Shattil | |
| 2004/0102202 A1 * | 5/2004 | Kumaran et al. | 455/515 |
| 2004/0116110 A1 | 6/2004 | Amerga et al. | |
| 2004/0184567 A1 | 9/2004 | McDonough et al. | |
| 2004/0189603 A1 | 9/2004 | Arrigo et al. | |
| 2004/0203838 A1 | 10/2004 | Joshi et al. | |
| 2004/0205198 A1 | 10/2004 | Zellner et al. | |
| 2004/0219925 A1 | 11/2004 | Ahya et al. | |
| 2004/0224684 A1 | 11/2004 | Dorsey et al. | |

| | | | | | | |
|---|---|---|---|---|---|---|
| 2005/0002461 | A1 | 1/2005 | Giannakis et al. | JP | 2005530392 | 10/2005 |
| 2005/0047357 | A1 | 3/2005 | Benveniste | KR | 2000011693 | 2/2000 |
| 2005/0049013 | A1 | 3/2005 | Chang et al. | KR | 100414932 B1 | 12/2003 |
| 2005/0058115 | A1 | 3/2005 | Levin et al. | RU | 2122288 | 11/1998 |
| 2005/0136960 | A1 | 6/2005 | Timus et al. | RU | 2168277 | 5/2001 |
| 2005/0153751 | A1 | 7/2005 | Bultan et al. | RU | 2005102111 | 10/2005 |
| 2005/0176436 | A1 | 8/2005 | Mantravadi et al. | WO | WO9512297 | 5/1995 |
| 2005/0233710 | A1 | 10/2005 | Lakkis et al. | WO | WO9626620 A1 | 8/1996 |
| 2006/0023666 | A1 | 2/2006 | Jalali et al. | WO | WO9627993 A1 | 9/1996 |
| 2006/0087993 | A1 | 4/2006 | Sengupta et al. | WO | WO9712475 A1 | 4/1997 |
| 2006/0093067 | A1 | 5/2006 | Jalali et al. | WO | WO9746038 | 12/1997 |
| 2006/0172747 | A1 | 8/2006 | Mohammed | WO | WO9938278 | 7/1999 |
| 2006/0194577 | A1 | 8/2006 | Su | WO | WO0010353 A1 | 2/2000 |
| 2006/0203713 | A1 | 9/2006 | Laroia et al. | WO | WO0038457 A1 | 6/2000 |
| 2006/0246840 | A1 | 11/2006 | Borowski et al. | WO | WO0054542 A1 | 9/2000 |
| 2006/0262739 | A1 | 11/2006 | Ramirez et al. | WO | WO0067394 A2 | 11/2000 |
| 2006/0269005 | A1 | 11/2006 | Laroia et al. | WO | WO0074292 | 12/2000 |
| 2007/0042775 | A1 | 2/2007 | Umatt et al. | WO | WO03001726 A1 | 1/2003 |
| 2007/0082696 | A1 | 4/2007 | Wang | WO | WO03065628 A1 | 8/2003 |
| 2007/0173202 | A1 | 7/2007 | Binder et al. | WO | WO2004098093 A1 | 11/2004 |
| 2007/0189259 | A1 | 8/2007 | Sollenberger et al. | WO | WO2004105337 | 12/2004 |
| 2007/0201346 | A1 | 8/2007 | Geile et al. | WO | WO2005020490 | 3/2005 |
| 2007/0207815 | A1 | 9/2007 | Alfano et al. | | | |
| 2007/0223365 | A1 | 9/2007 | Tsfaty et al. | | | |
| 2007/0230403 | A1 | 10/2007 | Douglas et al. | | | |
| 2007/0242764 | A1 | 10/2007 | Anigstein et al. | | | |
| 2007/0259673 | A1 | 11/2007 | Willars et al. | | | |
| 2007/0286080 | A1 | 12/2007 | Kim et al. | | | |
| 2007/0291728 | A1 | 12/2007 | Dalsgaard et al. | | | |
| 2008/0027586 | A1 | 1/2008 | Hern et al. | | | |
| 2008/0046132 | A1 | 2/2008 | Dalsgaard et al. | | | |
| 2008/0101268 | A1 | 5/2008 | Sammour et al. | | | |
| 2008/0102880 | A1 | 5/2008 | Gholmieh et al. | | | |
| 2008/0123576 | A1 | 5/2008 | Son et al. | | | |
| 2008/0130543 | A1 | 6/2008 | Singh et al. | | | |
| 2008/0165698 | A1 | 7/2008 | Dalsgaard et al. | | | |
| 2008/0212710 | A1 | 9/2008 | Boehlke et al. | | | |
| 2008/0261530 | A1 | 10/2008 | Gerstenberger et al. | | | |
| 2008/0285488 | A1 | 11/2008 | Walton et al. | | | |
| 2008/0285669 | A1 | 11/2008 | Walton et al. | | | |
| 2008/0285670 | A1 | 11/2008 | Walton et al. | | | |
| 2009/0005095 | A1 | 1/2009 | Chun et al. | | | |
| 2009/0122736 | A1 | 5/2009 | Damnjanovic et al. | | | |
| 2009/0274084 | A1 | 11/2009 | Terry et al. | | | |
| 2010/0027502 | A1 | 2/2010 | Chen et al. | | | |
| 2010/0029212 | A1 | 2/2010 | Malladi et al. | | | |
| 2010/0093363 | A1 | 4/2010 | Malladi | | | |
| 2010/0182942 | A1 | 7/2010 | Kim et al. | | | |
| 2010/0234059 | A1 | 9/2010 | Yang et al. | | | |
| 2010/0262404 | A1 | 10/2010 | Bertness | | | |
| 2010/0267420 | A1 | 10/2010 | Chou | | | |
| 2011/0142150 | A1 | 6/2011 | Anigstein et al. | | | |

FOREIGN PATENT DOCUMENTS

| | | |
|---|---|---|
| EP | 0923202 | 6/1999 |
| EP | 0961515 A1 | 12/1999 |
| EP | 0986278 A1 | 3/2000 |
| EP | 1022920 A2 | 7/2000 |
| EP | 1079578 A2 | 2/2001 |
| EP | 1361686 A1 | 11/2003 |
| EP | 1592176 A1 | 11/2005 |
| JP | 8162998 | 6/1996 |
| JP | 10112695 | 4/1998 |
| JP | 10313286 | 11/1998 |
| JP | 11178050 | 7/1999 |
| JP | 11196043 | 7/1999 |
| JP | 2001111522 | 4/2001 |
| JP | 2004023391 A | 1/2004 |
| JP | 2004153311 A | 5/2004 |

OTHER PUBLICATIONS

International Search Report with Written Opinion of the International Searching Authority from International Application No. PCT/US2004/004700; pp. 1-4, dated Aug. 10, 2005.
International Preliminary Report on Patentability from International Application No. PCT/US2004/004700; pp. 1, dated Sep. 16, 2005.
Written Opinion—PCT/US04/004700, International Search Authority—US, Aug. 10, 2005.
International Preliminary Report on Patentability—PCT/US04/004700, The International Bureau of WIPO—Geneva, Switzerland, Sep. 16, 2005.
Digital Cellular telecommunications system (Phase 2+); Universal Mobile.
Telecommunications System (UMTS); Non-Access-Stratum (NAS) functions related to Mobile Station (MS) in idle mode (3GPP TS 23.122 version 7.3.0 Release 7); ETSI TS123 122 ETSI Standards, European Telecommunication Standards Institute, Sophia-Antipo, FR, vol. 3—CN1, No. V7.3.0. Sep. 2005, XP014032445.
Goldsmith A Ed—Singh A: "Multiuser capacity of cellular time-varying channels" Signals, Systems and Computers; 1994. 1994 Conference Record of the Twenty-Eighth Asilomar Conference on Pacific Grove, CA, USA Oct. 31-Nov. 2, 1994, Los Alamitos, CA, USA, IEEE Comput. Soc, US, vol. 1, Oct. 31, 1994, pp. 83-88, XP010148618 ISBN: 978-0/8186-6405-2 * p. 85, left-hand col. *.
Jianming Zhu et al: "Ergodic capacities for downlink of mc-cdma system with different detection and resource allocation strategies" Conference Record of the 36TH. Asilomar Conference on Signals, Systems, & Computers. Pacific Groove, CA, Nov. 3-6, 2002; [Asilomar Conference on Signals, Systems and Computers], New York, NY IEEE, US, vol. 2, Nov. 3, 2002, pp. 1458-1462, XP010638439 ISBN: 978-0/7803-7576-5 * p. 1461, right-hand column, paragraph 1*.
Pradhan S S et al: "Efficient layered video delivery over multicarrier systems using optimized embedded modulation" Image Processing, 1997. Proceedings., International Conference on Santa Barbara, CA, USA Oct. 26-29, 1997, Los Alamitos, CA, USA, IEEE Comput. Soc, US, vol. 3, Oct. 26, 1997, pp. 452-455, XP010253736 ISBN: 978-0/8186-8183-7 * p. 452, right-hand column, paragraphs 1,2 * p. 454, section 3.3.
Supplementary European Search Report—EP04712817, Search Authority—Berlin Patent Office—Apr. 24, 2009.

* cited by examiner

METHODS AND APPARATUS OF ENHANCED CODING IN MULTI-USER COMMUNICATION SYSTEMS

RELATED APPLICATIONS

This application claims the benefit of U.S. Provisional Patent Application Ser. No. 60/471,000 filed on May 16, 2003, titled: "METHODS AND APPARATUS OF ENHANCING SUPERPOSITION CODING IN MULTI-USER COMMUNICATION SYSTEMS" and is a continuation-in-part of U.S. patent application Ser. No. 10/324,194, filed on Dec. 20, 2002, which issued as U.S. Pat. No. 6,788,963 and which claims the benefit of U.S. Provisional Patent Application Ser. No. 60/401,920 filed Aug. 8, 2002.

FIELD OF THE INVENTION

The present invention is directed to improved methods of coding and transmitting information in a wireless communications system.

BACKGROUND

Superposition coding will be discussed in multi-user communications systems. Multi-user communication systems involve several transmitters and receivers communicating with each other and may use one or more communications methods. In general, multi-user communication methods may be categorized into one of two scenarios:
   (a) A single transmitter communicating with several receivers, commonly referred to as a broadcast communications method, and
   (b) Several transmitters communicating to a common receiver, which is commonly referred to as a multiple-access communications method.

The broadcast communications method is commonly known in the communications and information theory literature as the 'broadcast channel' and will be referred to as such in the rest of this document. The 'broadcast channel' refers to the physical communication channels between the transmitter and the multiple receivers as well as the communication resources used by the transmitter to communicate. Similarly, the multiple-access communications method is widely known as the 'multiple-access channel' and the remainder of this document will use this terminology. Once again, the 'multiple-access channel' refers to the physical communication channels between the multiple transmitters and the common receiver, along with the communication resources used by the transmitters. The broadcast communications method is frequently used to implement the downlink communication channel in a typical cellular wireless system, where the base station broadcasts to a plurality of wireless terminals, while the uplink channel in such a system is commonly implemented using the multiple-access communications method, where a plurality of wireless terminals may transmit signaling to a base station.

The transmission resource in the multi-user communication system can generally be represented in time, frequency or code space. Information theory suggests that the capacity of the system can be increased in both scenarios, in particular, by transmitting to multiple receivers simultaneously in the case of the broadcast communications method, or by allowing multiple transmitters to transmit simultaneously in the case of the multiple-access communications method, over the same transmission resource, e.g., over the same frequencies at the same time. In the case of the broadcast communications method, the technique used to transmit simultaneously to multiple users over the same transmission resource is also known as 'superposition coding'. In the context of the present invention, controlled superposition coding is shown to be a valuable practical technique in both broadcast and multiple-access communications methods.

The advantages of superposition coding will be apparent in view of the following discussion of transmission techniques for the broadcast communications method. Consider a single transmitter communicating with two receivers, whose channels can be described by ambient Gaussian noise levels of $N_1$ and $N_2$, with $N_1 < N_2$, i.e., the first receiver operates over a stronger channel than the second receiver. Assume that the communication resources available to the transmitter are a total bandwidth of W, and a total power of P. The transmitter may employ several strategies to communicate with the receivers. FIG. 1 includes a graph 100 which plots achievable rates in a broadcast channel, for a first user, with a stronger receiver and a second receiver, with a weaker receiver, under three different transmission strategies. The vertical axis 102 of FIG. 1 represents the rate for the stronger receiver, while the horizontal axis 104 represents the rate for the weaker receiver.

First, consider the strategy where the transmitter multiplexes between the two receivers in time, allocating all its resources to one receiver at a time. If the fraction of time spent communicating with the first (stronger) receiver is denoted by $\alpha$, it is easy to show that the achievable rates for the two users satisfy $$R_1 \leq \alpha W \log\left(1 + \frac{P}{N_1}\right),$$

$$R_2 \leq (1-\alpha) W \log\left(1 + \frac{P}{N_2}\right)$$

As the fraction of time spent serving the first user, $\alpha$, varies, the rates achieved by the above equations are represented with the straight line 106 in FIG. 1 representing the Time Division Multiplexing (TDM) strategy. Now consider a different transmission strategy where the transmitter allocates a certain fraction of the bandwidth, $\beta$, and a fraction of the available power, $\gamma$, to the first user. The second user gets the remaining fractions of bandwidth and power. Having allocated these fractions, the transmitter communicates with the two receivers simultaneously. Under this transmission strategy, the rate region can be characterized by the following equations $$R_1 \leq \beta W \log\left(1 + \frac{\alpha P}{N_1}\right),$$

$$R_2 \leq (1-\beta) W \log\left(1 + \frac{(1-\alpha) P}{N_2}\right).$$

The rates achieved by the above equations are visualized intuitively from the convex curve segmented line 108 in FIG. 1 representing the frequency division multiplexing (FDM) strategy. It is evident that the strategy of dividing the available power and bandwidth between the two users in an appropriate manner outperforms the time-division partition of resources. However, the second strategy is not yet the optimal one.

The supremum of the rate regions achievable under all transmission strategies is the broadcast capacity region. For the Gaussian case, this region is characterized by the equations $$R_1 \le W \log\left(1 + \frac{\alpha P}{N_1}\right),$$

$$R_2 \le W \log\left(1 + \frac{(1-\alpha)P}{\alpha P + N_2}\right).$$

and is indicated by the dashed curve line 110 in FIG. 1 representing capacity. It was shown by Thomas Cover in T. M. Cover, *Broadcast Channels*, IEEE Transactions on Information Theory, IT-18 (1):2 14, 1972, that a communication technique called superposition coding could achieve this capacity region. In this technique, the signals to different users are transmitted with different powers in the same transmission resource and superposed on each other. The gains achievable through superposition coding surpass any other communication technique that requires splitting of the transmission resource among different users.

The basic concept of superposition coding is illustrated in graph 200 of FIG. 2. Graph 200 includes a vertical axis 202 representing quadrature and a horizontal axis 204 representing in-phase. While this example assumes QPSK modulation, the choice of modulation sets is not restrictive in general. Also, this example is sketched out for two users with the concept generalizing in a straightforward manner to multiple users. Assume that the transmitter has a total transmit power budget P. Suppose that the first receiver, referred to as 'weaker receiver', sees larger channel noise and the second receiver, referred to as 'stronger receiver', sees smaller channel noise. Four circles filled in with a pattern 205 represent the QPSK constellation points to be transmitted at high power (better protected), (1−α)P, to the weaker receiver, where arrow 206 provides a measure of the high power QPSK transmission strength. Meanwhile, additional information is conveyed to the stronger receiver at low power (less protected), αP, also using a QPSK constellation, where arrow 207 provides a measure of the lower power QPSK transmission strength. The actually transmitted symbols, which combine both the high power and low power signals, are represented as the blank circles 208 in FIG. 2. A key concept that this illustration conveys is that the transmitter communicates to both users simultaneously using the same transmission resource. In this document, the high power signal is also called a protected signal, and the low power signal is also a called regular signal.

The receiver strategy is quite straightforward. The weaker receiver sees the high power QPSK constellation with a low-power signal superposed on it. The Signal-to-Noise Ratio (SNR) experienced by the weaker receiver may be insufficient to resolve the low-power signal, so the low power signal appears as noise and slightly degrades the SNR when the weaker receiver decodes the high power signal. On the other hand, the SNR experienced by the stronger receiver is sufficient to resolve both the high power and low power QPSK constellation points. The stronger receiver's strategy is to decode the high-power points (which are intended for the weaker receiver) first, remove their contribution from the composite signal, and then decode the low-power signal.

However, in practice, this strategy normally does not work well. Any imperfections in cancellation of the high-power signal manifest themselves as noise to the decoder recovering the low-power signal.

In light of the above discussion, it is clear that a need exists for novel methods and apparatus that will allow communications systems to operate in a broadcast and/or multiple access communications method using controlled superposition coding to take advantage of the benefits of higher achievable rates in the channel, yet overcome the practical difficulties encountered of imperfect cancellation of the high power signal and the complexity and cost associated with joint decoder approach.

SUMMARY OF THE INVENTION

This invention is directed to transmitter and receiver techniques for coding that enable decoding of the regular signal without being compromised by imperfect cancellation of the protected signal.

An exemplary embodiment of the invention is described below in the context of a cellular wireless data communication system using Orthogonal Frequency Division Multiplexing (OFDM). While an exemplary wireless system is used for purposes of explaining the invention, the invention is not limited to the exemplary embodiment and can be applied to many other communication systems as well, e.g. systems using Code Division Multiple Access (CDMA).

In accordance with various embodiments of the invention, first and second sets of information are transmitted using a transmission block, the transmission block including a plurality of minimum transmission units, each minimum transmission unit corresponding to a unique combination of resources, said resources including at least two of time, frequency, phase, and spreading code. A minimum transmission unit is also called a degree of freedom. In this document, the terms of minimum transmission unit and degree of freedom are used interchangeably. The transmission block may be relatively large when compared to the minimum size transmission block which may be required to code one of the information sets to be transmitted.

One exemplary embodiment of the invention includes defining a first set of said minimum transmission units for use in conveying said first set of information, said first set of minimum transmission units including at least a majority of the minimum transmission units in the transmission block, defining a second set of said minimum transmission units for use in conveying said second set of information, said second set of minimum transmission units including less minimum transmission units than first set; at least some of minimum transmission units in the first and second sets of minimum transmission units being the same; and communicating the first and second sets of information using minimum transmission units included in said first and second sets of minimum transmission units. A first set of said minimum transmission units included in the transmission block are used in conveying said first set of information, said first set including at least a majority of said minimum transmission units in the transmission block. A second set of said minimum transmission units is defined, e.g., selected, for use in conveying said second set of information, said second set of minimum transmission units including less minimum transmission units than first set; at least some of minimum transmission units in the first and second sets of minimum transmission units being the same. The first and second sets of information are communicated by transmitting at least some minimum transmission units included in said first and second sets of minimum transmission units with the corresponding information modulated thereon. The communicating of the information may be through superposition of the first and second information on shared minimum transmission units or by puncturing the first set of information so that the second set of information is transmitted on the minimum information units which are common to the first and second sets. Error correcting codes may be used to recover information lost due to the superposition of the second set of information on the shared transmission units. The information transmitted in the first and second sets of information may be, e.g., user data and control information including acknowledgements and assignment.

The first and second sets of information can, and in various embodiments are, transmitted using the first and second segments of minimum transmission units, by transmitting the minimum transmission units including the modulated information corresponding to different information sets from different transmitters. The transmitters may be located on different devices, e.g., wireless terminals. In other embodiments, the first and second sets of information are communicated by transmitting the minimum transmission units used to convey the first and second sets of information from a single transmitter, e.g., a base station transmitter.

The first set of minimum transmission units includes a majority of the minimum transmission units in the transmission block but usually a high percentage of the minimum transmission units, e.g., in some embodiments the first set of minimum transmission units includes at least 75% of the total number of minimum transmission units and, in some cases, 100% of the minimum transmission units in said block. The second set of minimum transmission units normally includes less than 50% of the minimum transmission units in a block and, in some cases relatively few minimum transmission units, e.g., less than 5 or 10% of the number of minimum transmission units in the transmission block. In such cases, even if none of the minimum transmission units in the second set of transmission units are recovered by a receiver attempting to decode the minimum transmission units used to communicate the first set of information, the information from the first set intended to be transmitted on some of the minimum transmission units included in the second set can be recovered, in some embodiments, through the use of error correction codes.

True superposition can be used to communicate information corresponding to both the first and second sets of information using a minimum transmission unit common to both the first and second sets of minimum transmission units. Alternatively, the information corresponding to the first set of information intended to be transmitted on shared minimum information units may be punctured, e.g., not transmitted, with the punctured information being recovered through the use of error correcting codes.

In one particular exemplary embodiment, as part of the process of communicating said first and second sets of information using at least some minimum transmission units included in the first set of minimum transmission units may be transmitted at a first power level while minimum transmission units in said second set of minimum transmission units are transmitted at a higher power level than said first signal on a per minimum transmission unit basis. The power level at which the minimum information units in said second set are transmitted is, in some implementations, at least 3 dB greater than the power level at which the minimum transmission units corresponding to the first signal is transmitted. The power level of the minimum information units in said first and second sets sometimes can, and are, varied, e.g., to reflect changing channel conditions.

Various receiver embodiments are possible in accordance with the invention. Two receivers, e.g., first and second receivers, can operate independently and in parallel. Once receiver being used to recover the first set of information and the other receiver being used to recover the second set of information from the minimum information units in said transmission block which are actually transmitted. In one such embodiment the first receiver treats minimum information blocks including a signal corresponding to the second set of information as including impulse noise and, e.g., discards, ignores or otherwise minimizes their contribution to the receiver's output. In such an implementation, the second receiver treats the contribution of signals corresponding to the first set of information to the received minimum transmission units as background noise. Since the signal corresponding to the second set of information is normally transmitted using relatively high power levels, e.g., power levels sufficient to have the first receiver interpret the signals as impulse noise, it is usually relatively easy to recover the second signals even in the case where the signals corresponding to the first set of information appear as background noise. Since the effect of transmitting the second set of information is generally limited to relatively few symbols in a transmission block, the effect of the high power signals on the signals used transmit the first set of information tends to be very localized allowing for the recovery of any lost information, in many cases through the use of conventional error correction codes included in the transmitter information.

In another embodiment of the invention, an apparatus also includes two receivers. However, rather than working independently in parallel, the first receiver identifies minimum transmission units which correspond to the second set of information, e.g., high power minimum transmission units. It then conveys information indicating which received minimum transmission units correspond to the second information set to the second receiver. The second receiver discards minimum transmission units corresponding to the second set of information and then decodes the remaining received minimum transmission units. Since the number of discarded minimum information units tends to be small, e.g. under 5% of received minimum information units in many cases, the second receiver is normally able still recover the full first set of information through the use of error correction codes used to protect the transmitted information against errors due to loss or corruption of minimum transmission units during transmission.

In various embodiments, invention realizes the benefits of superposition coding in a multiuser communication system while using a receiver that is simple in design yet robust in terms of operational performance. The invention discloses novel effective superposition coding techniques for both the broadcast channel and the multiple-access channel.

In the broadcast scenario, e.g., a single transmitter sends data to a plurality of receivers. In the context of the exemplary system, the transmitter is the base station communicating over the cellular downlink with wireless receivers, e.g. mobile receivers. Mobile users in a cellular system can experience a wide range of SNR conditions due to the variance in path loss as a function of location within the cell. Assume without loss of generality that the base station has two signals that it wants to communicate simultaneously to two different mobile receivers, experiencing different path loss. The regular signal is intended for a receiver that experiences a higher signal-to-noise ratio (SNR), which is referred to hereafter as a 'stronger' receiver. The second signal, termed a 'protected' signal, is intended for a 'weaker' receiver that operates over a lower quality channel with lower SNR. The categorization of mobile receivers as 'stronger' or 'weaker' is not static and is a relative definition.

If superposition coding is not used, then the airlink resources should be partitioned between the regular and the protected signal, which is not optimal. In order to differentiate the new superposition coding method disclosed in this invention, the existing method of superposition coding described in the background section is hereafter referred to as "classical superposition coding" in the remainder of this document. In the context of classical superposition coding, both the protected signal and the regular signal are transmitted with the same airlink resource. For example, suppose that the airlink resource to transmit both the regular and protected codewords comprises K symbols, $A_1, \ldots, A_K$. Furthermore suppose that the regular codeword is to carry M information bits and the protected codeword is to carry N information bits. Assume that both the regular and the protected codewords utilize BPSK (binary phase shift keying) modulation. In the classical supposition coding, the M regular information bits are converted to K coded bits by an encoding scheme, such as convolutional coding, and the K coded bits are then mapped to K BPSK symbols $B_1, \ldots, B_K$. Meanwhile, the N protected information bits are converted to another K coded bits by another encoding scheme, such as convolutional coding, and the K coded bits are then mapped to K BPSK symbols $C_1, \ldots, C_K$. Finally the K BPSK symbols from the protected information bits and the K BPSK symbols from the regular information bits are combined and transmitted using the K airlink resource symbols $A_1, \ldots, A_K$: $A_1=B_1+C_1, \ldots, A_K=B_K+C_K$. In the composite signal, the protected symbols are generally transmitted at higher power per bit in order that the weaker receivers are able to receive them reliably. The regular symbols are transmitted at relatively lower power per bit. In this example, and indeed in general, the energy of the regular signal is distributed among all the degrees of freedom on which the protected signal is transmitted.

The powers are chosen at the transmitter in such a manner that the weaker receiver is typically only in a position to decode the protected codeword. The regular signal simply appears as noise to this receiver. The stronger receiver, on the other hand, should be in a position to decode both codewords. A good decoding strategy that the stronger receiver could employ is to attempt to decode the two codewords jointly. However, this is often much too complex for practical receivers. Hence, the strategy usually employed by the stronger receiver is successive decoding. The stronger receiver first decodes the protected codeword, then subtracts it from the composite received signal, and finally decodes the regular codeword, which is the codeword of interest to the stronger receiver. In practice, however, the above successive cancellation and decoding scheme may not always be accomplished robustly. If the SNRs of the stronger and weaker receivers and the rates that required to be communicated are such that the regular and superposed signals are transmitted at roughly the same power, then cancellation of the protected codeword may be difficult or inaccurate.

Obstacles to successive decoding exist in practice even when the transmitted powers on the two codewords are different. For example, most communication systems experience a degree of self-noise at the receiver. Unlike additive noise, this self-noise is usually correlated with the transmitted signal and has an energy that is proportional to the transmitted power. Channel estimation noise in wireless communication systems is an example of self-noise. In the context of classical superposition coding, channel estimation noise causes imperfect cancellation of the protected signal at the stronger receiver. The residual cancellation error may have substantial energy, especially when compared with the low-power superposed signal. Consequently, the stronger receiver may not be able to decode the regular codeword correctly given the residual cancellation error.

From this discussion, it is apparent that while classical superposition coding distributes the energy of the protected codeword over each of the degrees of freedom, it is desirable to concentrate this energy among one or a few degrees of freedom. The concentration of energy on a limited number of degrees of freedom, in accordance with the invention, facilitates easy detection and cancellation of the protected signal at the receiver, even when the overall transmit energy included in the two signals is similar. In accordance with the invention, the energy in the codeword is concentrated among one or a few degrees of freedom.

Using the above described coding and transmission methods, multiples sets of information can be transmitted using a shared overlapping set of communications resources, e.g., time, frequency and/or code. Numerous additional features and benefits of the invention will be apparent in view of the detailed description that follows.

DETAILED DESCRIPTION

This invention is directed to transmitter and receiver techniques for coding that enable decoding of the regular signal without being compromised by imperfect cancellation of the protected signal.

Figure 17:
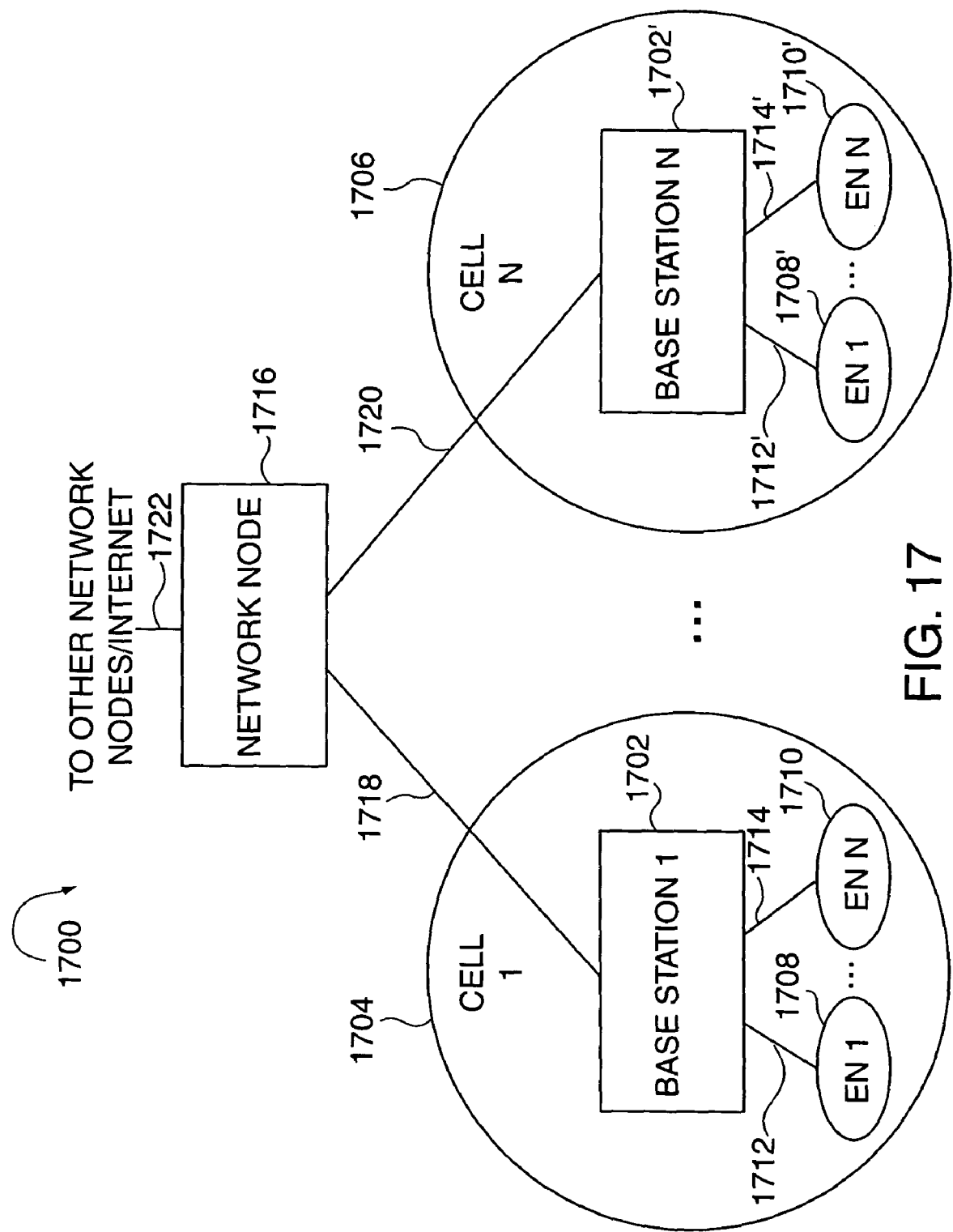
FIG. 17 illustrates an exemplary communications system implementing the apparatus and methods of the present invention.

FIG. 17 illustrates an exemplary communications system 1700 using apparatus and methods in accordance with the present invention. Exemplary communications system 1700 includes a plurality of base stations including base station 1 (BS 1) 1702 and base station N (BS N) 1702'. BS 1 1702 is coupled to a plurality of end nodes (ENs), EN 1 1708, EN N 1710 via wireless links 1712, 1714 respectively. Similarly, BS N 1702' is coupled to a plurality of end nodes (ENs), EN 1 1708', EN N 1710' via wireless links 1712', 1714' respectively. Cell 1 1704 represents the wireless coverage area in which BS 1 1702 may communicate with ENs, e.g., EN 1 1708. Cell N 1706 represents the wireless coverage area in which BS N 1702' may communicate with ENs, e.g., EN 1 1708'. ENs 1708, 1710, 1708' and 1710' may move throughout the communications system 1700. The base stations BS 1 1702, BS N 1702' are coupled to a network node 1716 via network links 1718, 1720, respectively. The network node 1716 is coupled to other network nodes, e.g., other base station, routers, home agent node, Authentication Authorization Accounting (AAA) server nodes, etc., and the Internet via network link 1722. Network links 1718, 1720, 1722 may be, e.g., fiber optic cables. Network link 1722 provides an interface outside the communications system 1700, allowing users, e.g. ENs, to communicate with nodes outside system 1700.

Figure 18:
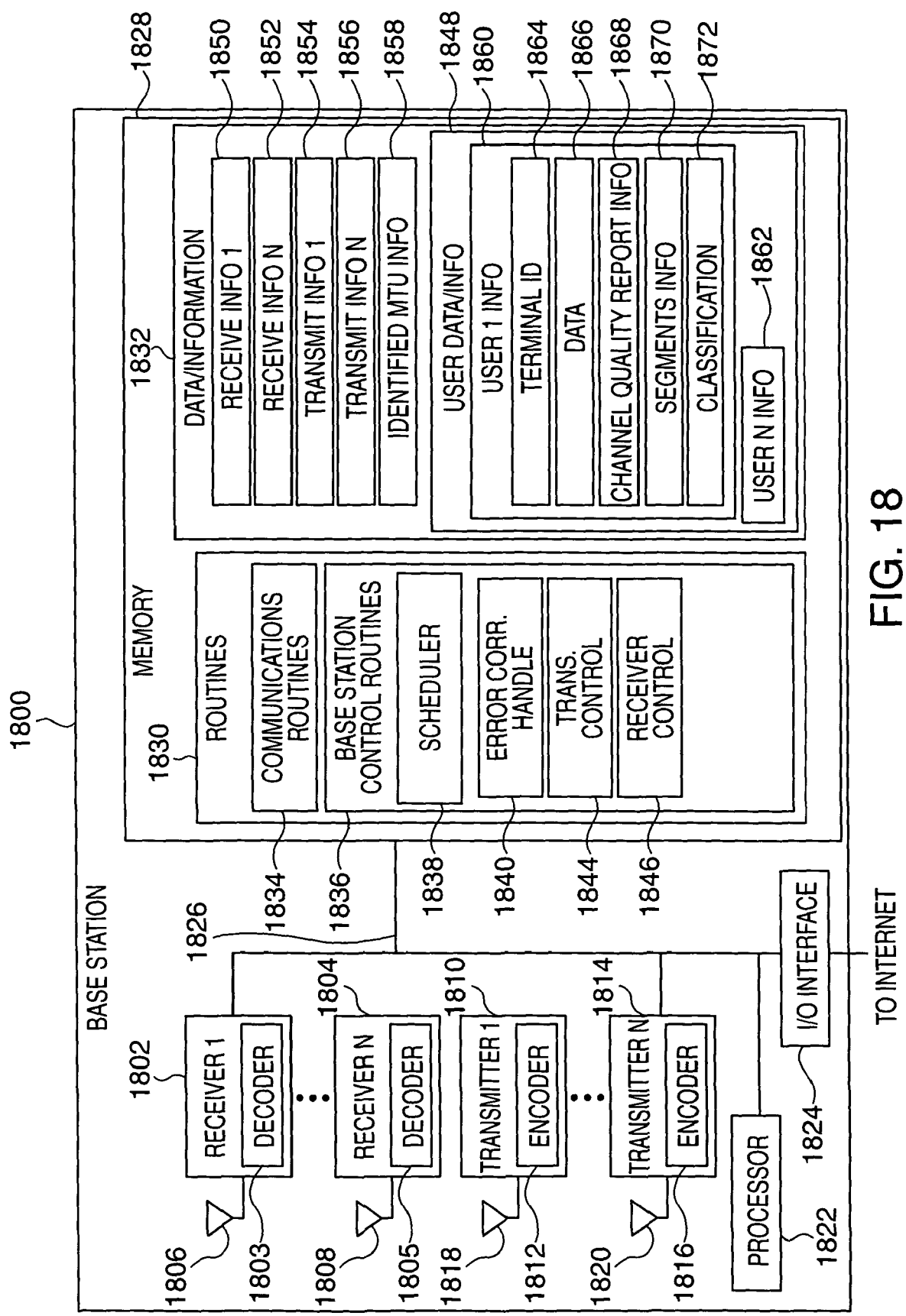
FIG. 18 illustrates an exemplary base station implemented in accordance with the present invention.

FIG. 18 illustrates an exemplary base station 1800 in accordance with the present invention. Exemplary base station 1800 may be a more detailed representation of base stations 1702, 1702' of FIG. 17. Exemplary base station 1800 includes a plurality of receivers, receiver 1 1802, receiver N 1804, a plurality of transmitters, transmitter 1 1810, transmitter N 1814, a processor 1822, e.g., CPU, an I/O interface 1824 and memory 1828 coupled together via a bus 1826. The various elements 1802, 1804, 1810, 1814, 1824, and 1828 may exchange data and information over bus 1826.

The receivers 1802, 1804 and the transmitters 1810, 1814 are coupled to antennas 1806, 1808 and 1818, 1820 respectively, providing a way for the base station 1800 to communicate, e.g. interchange data and information, with end nodes, e.g. wireless terminals, within its cellular coverage area. Each receiver 1802, 1804 may include a decoder 1803, 1805, respectively, which receives and decodes signaling, which had been encoded and transmitted by end nodes operating within its cell. The receivers 1802, 1804 may be any of or variations of the exemplary receivers shown in devices 5 1502 of FIG. 15, device 6 1532 of FIG. 15, or device 7 1562 of FIG. 16, e.g., receivers (1506, 1508), (1536, 1542), (1563, 1564). The receivers 1802, 1804 shall, in accordance with the invention, be able to receive a combined signal including, a regular or underlying signal and a flash signal and retrieve sets of information corresponding to the original pre-transmission sets of information. Each of transmitters 1810, 1814 may include an encoder 1812, 1816, which encodes signaling prior to transmission. The transmitters 1810, 1814 may be any of or variations of the exemplary transmitters shown in device 1 1302 and device 2 1308 of FIG. 13, device 3 of FIG. 14 or device 4 1410 of FIG. 14, e.g. transmitters (1304 and 1310), (1404), (1412). The transmitters 1802, 1805 shall, in accordance with the invention, be able to transmit one or more of the following: regular or underlying signal, flash signal, and/or combined signal.

The memory 1828 includes routines 1830 and data/information 1832. The processor 1822 controls the operation of the base station 1800 by executing routines 1830 and utilizing data/information 1832 in memory 1828 to operate the receiver(s) 1802, 1804, the transmitters 1810, and the I/O interface 1824, to perform the processing controlling basic base station functionality, and to control and implement the new features and improvements of the present invention including the generation and transmission of combined signals, the receiving of combined signals, separation of the combined signal into regular or underlying signal information and flash signal information, separation and recovery of information. I/O interface 1824 provides base station 1800 with an interface to the Internet and other network nodes, e.g. intermediate network nodes, routers, AAA server nodes, home agent nodes, etc., thus allowing end nodes communicating through wireless links with base station 1800 to connect, communicate, and interchange data and information with other peer nodes, e.g., another end node, throughout the communication system and external to the communication system, e.g., via the Internet.

Routines 1830 include communications routines 1834, and base station control routines 1836. The base station control routine 1836 includes a scheduler 1838, an error detection and correcting module 1840, a transmitter control routine 1844 and a receiver control routine 1846. The data/information 1832 includes receiver information 1 1850, received information N 1852, transmit information 1 1854, transmit information N 1856, identified MTU information 1858, and user data/info 1848. The user data/info 1848 includes a plurality of user information, user 1 information 1860, and user n information 1862. Each user information, e.g., user 1 info 1860, includes terminal Identification (ID) information 1864, data 1866, channel quality report information 1868, segment information 1870, and classification informationl 872.

Transmit Information 1 1854 may include a set of information that may correspond to a first signal, e.g., a regular or underlying signal, information defining the transmission block of MTUs that may be used to transmit the first signal, information defining a first set of MTUs that will be used to define the signal, information that would be modulated on the first set of MTUs to define the first signal, information defining which MTUs corresponding to first signal information shall be transmitted to e.g., a wireless terminal. In some embodiments each of the MTUs conveying a first set of information data will be transmitted. In other embodiments, most of the MTUs conveying a first set of information shall be transmitted. In such an embodiment, MTUs corresponding to the first set of information which also correspond to a second set of information, e.g., a flash signal, may be dropped prior to transmission.

Transmit information N 1856 may include a set of information that may correspond to a second signal, e.g., a flash signal, information defining the transmission block of MTUs that may be used to transmit the second signal, e.g., to a wireless terminal, information defining a second set of MTUs that will be used to define the second signal, information that would be modulated on the second set of MTUs to define the second signal. The first and second transmission blocks may be the same. In such a case, transmission block information which specifies the size and/or shape of the shared transmission block may, and often is, stored separately in memory 1828 from transmit information 1854, 1856. Received info 1 1850 includes a first set of recovered information from receiver 1, 1802, e.g., information corresponding to a first set of wireless terminal pre-transmission information. The first set of recovered information may have been recovered, e.g., from a regular or underlying signal. Received info N 1852 includes a second set of recovered information from receiver N, 1804, e.g., information corresponding to a second set of wireless terminal pre-transmission information. The second set of recovered information may have been recovered, e.g., from a flash signal.

The regular and flash signal defining each original pre-transmission set of information share some common MTUs. Identified MTU information 1856 may include a set of identified MTUs in the second or flash signal, the set of identified MTUs may have been obtained by receiver N's decoder 1805. Identified MTU information 1858 may be forwarded to receiver 1 1802, where the receiver can exclude those MTUs before passing the received signal to perform the error correcting module, or alternatively, the identified MTU info 1858 may be forwarded to the error detection and correction module 1840 in memory and/or the error detection and correction module in decoder 1803.

Data 1866 may include received data from end nodes and data to be transmitted to end nodes. In some embodiments, one terminal identifier ID 1864 is used for each of N wireless terminals which can interact with the base station at a point in time. Upon entering a cell a wireless terminal, e.g., end node is assigned a terminal ID 1864. Thus terminal IDs are reused as wireless terminals enter and leave a cell. Each base station has a set of terminal identifiers (terminal IDs) 1864 assigned to users, e.g. wireless terminals that are being serviced. Channel quality report information 1868 may include base station 1800 determined information on the user's channel quality, and feedback information from the user including downlink channel quality reports, interference information, power information from the wireless terminals. Segment information 1870 may include information defining the segments allocated to the users in terms of users in terms of usage type, e.g. traffic channel, assignment channel, request channel; characteristics, e.g., MTUs, frequency/phase and time, OFDM tone-symbols; type of signals to use for segment, e.g., regular or underlying vs. flash. Classification information 1872 includes information categorizing the user, e.g., wireless terminal, as a "stronger" or "weaker" transmitter.

Communications routines 1834 includes various communications applications which may be used to provide particular services, e.g., IP telephony services, text services and/or interactive gaming, to one or more users end nodes in the system.

Base station control routines 1836 perform functions including basic base station control and control relating to the apparatus and method of the present invention. Base station control routines 1836 exercises control over the signal generation and reception, error detection and correction, data and pilot hopping sequences, the I/O interface 1824, the allocation of segments to users, and the scheduling of users to terminal IDs 1864. More specifically, the scheduler 1838 schedules users to terminal IDs 1864, allocates segments to users using the user classification information 1872, and segment info 1870. The scheduler makes decisions as to which users and which segments should be assigned to regular or underlying signals and which users and which segments should be assigned to flash signals, in accordance with the invention. Certain users, e.g., those with high power available, and small amounts of information to transmit may be better suited to flash signaling than other users who may desire to transmit large amounts of information and have limited power available. Certain types of channels may be more suitable to utilize flash signaling. For example, in many cellular communications systems, control channels are transmitted at broadcast power since they are constrained by the mobile users with the weakest channels. Flash signaling is well suited for this application and its use can often result in power reduction with little or no loss in robustness. By using the classification info 1872 and the segment info 1870, the scheduler 1838 can match users with low downlink Signal to Noise Ratio (SNR) to regular segments within the channel, while users with high SNR can be matched to flash, e.g., "protected", segments within the channel.

Transmitter control module 1844 use data/info 1832 including transmit info 1 1854, transmit info N 1856, terminal ID 1864, data 1866, and segment info 1870 to generate the transmission signals and control the operation of the transmitters 1810, 1814 in accordance with the invention. For example, transmitter control module 1844 may control transmitter 1810 to encode via its encoder 1812 sets of information included in transmit 1 info 1 1854 into signal, e.g., a regular or underlying signal, which transmitter 1 1810 may transmit. Transmitter control module 1844 may encode the sets of info included in transmit info N 1856 into a flash or protected signal using the set of MTUs corresponding to the information 1856. Transmission control module 1844 may control transmitter N 1814 to encode via its encoder 1816 sets of information included in transmit info N 1854 into signal which transmitter N 1816 may transmit. For example, transmission control module 1844 may encode the set of info included in transmit N info 1856 into a flash or signal using the set of MTUs corresponding to the information 1856. Alternately, in various embodiments of the transmitters 1810, 1814, a single transmitter may be used which internally combines or mixes the signal based upon the transmit info 1 1854 and the transmit info N 1856 under the direction of the transmitter control module 1844. Such mixing operation may involve superimposing regular and flash signaling prior to transmission and/or selectively forming one MTU transmission set including each of the elements of the flash signal and the elements in the regular signal not included in the flash signal.

Receiver control module 1846 controls the operation of receivers 1802, 1804 to receive a combined signal and extract two sets of information, e.g., receiver info 1 1850, and receiver info N 1852, in accordance with the invention. The reception process under control of the receiver control module 1846 may include control of decoders 1803, 1805 and control of the other elements within the receivers. In some embodiments, the receiver control module 1846 controls impulse noise filters, background noise filters, and error correcting modules with the receivers 1802, 1804. In some embodiments, the receiver control module controls the $2^{nd}$ signal MTU identification module in one receiver, e.g., receiver N 1804, and the discarding module in another receiver, e.g., receiver 1 1802 and convey identified MTU information 1858 from receiver N 1804 to receiver 1 1802; this allows receiver 1 1802 to remove MTUs that include flash signal information, from the information stream entering the error detection module that is attempting to recover the regular signal information set.

Error and correcting module 1840 works in conjunction with or in place of an error detection and correction module that may be included in the receivers 1802, 1804. The error detection and correction capability included in the receivers 1802, 1804 and/or module 1840 allows the base station 1800 to reconstruct sets of information corresponding to pre-transmission sets of information, even though the (regular or underlying) signal representing the pre-transmission set of information has been affected by the superposition of a second flash signal (flash signal) or the punch through, e.g., replacement of some MTU, by a second signal (flash signal). In some implementations, the MTUs corresponding to the second set of information fully overlap the MTUs corresponding to the first set of information. In addition in some embodiments, the MTUs corresponding to the first set of information fully occupy a transmission block.

Figure 19:
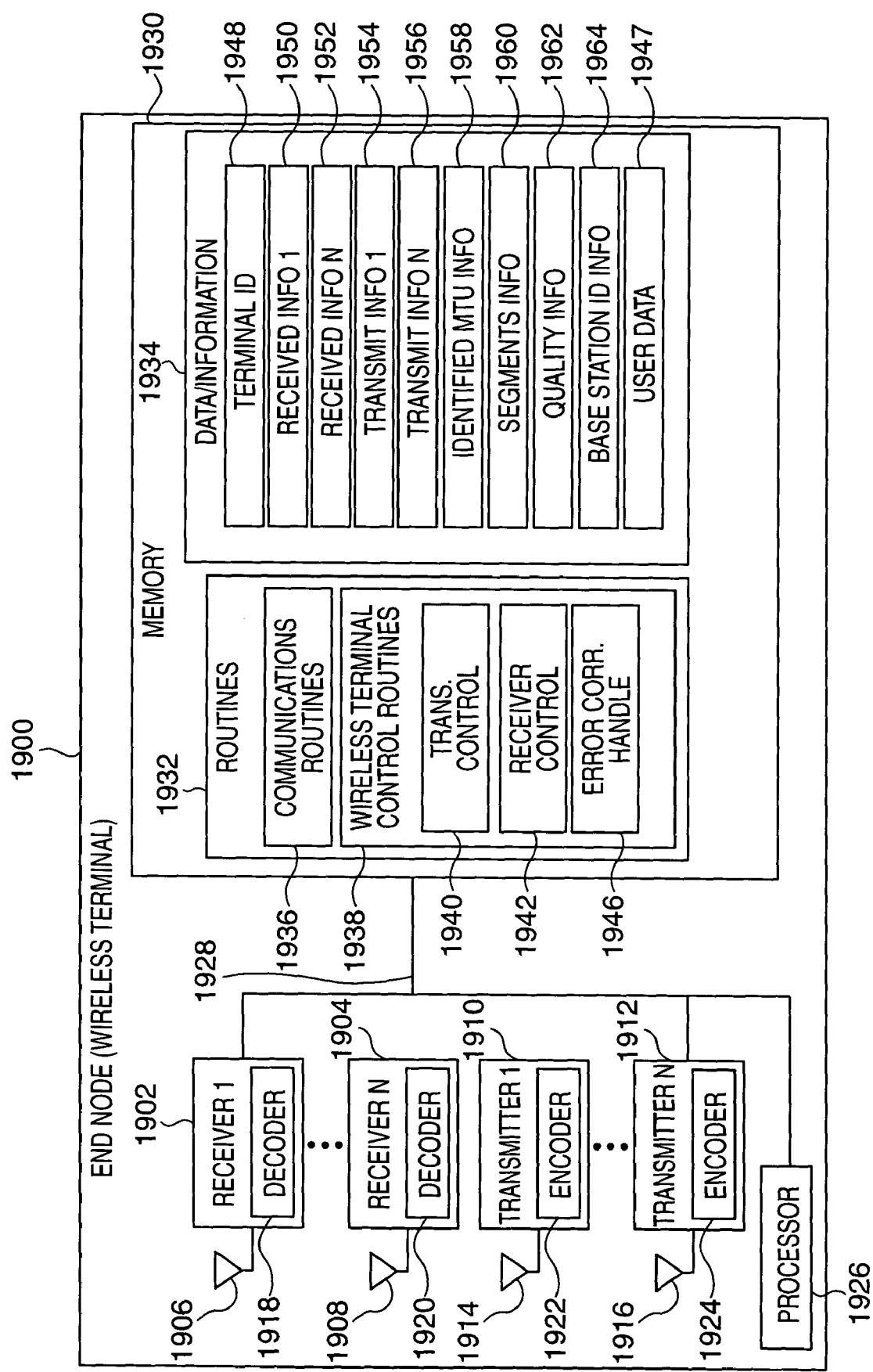
FIG. 19 illustrates an exemplary end node (wireless terminal) implemented in accordance with the present invention.

FIG. 19 illustrates an exemplary end node (wireless terminal) 1900 in accordance with the present invention. Exemplary end node 1900 may be used in any of the end nodes 1708, 1710, 1708', 1710' of FIG. 17. Exemplary end node 1900, e.g., wireless terminal, may be a mobile terminal, mobile, mobile node, fixed wireless device, etc. In this application, references to end node 1900 may be interpreted as corresponding to any one of a wireless terminal, mobile node, etc. Wireless terminals may be mobile nodes or stationary devices which support wireless communications links. Exemplary end node 1900 includes a plurality of receivers, receiver 1 1902, receiver N 1904, a plurality of transmitters, transmitter 1 1910, transmitter N 1912, a processor 1926, e.g., CPU, and memory 1930 coupled together via a bus 1928. The various elements 1902, 1904, 1910, 1912, 1926, 1930 may exchange data and information over bus 1928.

The receivers 1902, 1904 and the transmitters 1910, 1912 are coupled to antennas 1906, 1908 and 1914, 1916 respectively, providing a way for the end node, e.g., wireless terminal 1900 to communicate, e.g. interchange data and information with a base station 1800 in whose cellular coverage area the wireless terminal 1900 is operating. Each receiver 1902, 1904 may include a decoder 1918, 1920, respectively receives and decodes signaling, which had been encoded and transmitted by a base station 1800. The receivers 1902, 1904 may be any of or variations of the exemplary receivers shown in devices 5 1502 of FIG. 15, device 6 1532 of FIG. 15, or device 7 1562 of FIG. 16, e.g., receivers (1506, 1508), (1536, 1542), (1563,1564). The receivers 1902, 1904 shall, in accordance with the invention, be able to receive a combined signal including, a regular or underlying signal and a flash signal and retrieve sets of information corresponding to the original pre-transmission sets of information. Each transmitter 1910, 1912 may include an encoder 1922, 1946, which encodes signaling prior to transmission. The transmitters 1910, 1912 may be any of or variations of the exemplary transmitters shown in device 1 1302 and device 2 1308 of FIG. 13, device 3 of FIG. 14 or device 4 1410 of FIG. 14, e.g. transmitters (1304 and 1310), (1404), (1412). The transmitters 1910, 1912 shall, in accordance with the invention, be able to transmit one or more of the following: regular or underlying signal, flash signal, and/or combined signal.

The memory 1930 includes routines 1932 and data/information 1934. The processor 1926 controls the operation of the end node 1900 by executing routines 1932 and utilizing data/information 1934 in memory 1930 to operate the receivers 1902,1904 and the transmitters 1910, 1912, to perform the processing controlling basic wireless terminal functionality, and to control and implement the new features and improvements of the present invention including the generation and transmission of combined signals, the receiving of combined signals, separation of the combined signal into regular or underlying signal information and flash signal information, separation and recovery of information.

Routines 1932 include communications routines 1936 and wireless terminal control routines 1938. The wireless terminal control routine 1938 includes a transmitter control module 1940, a receiver control module 1942, an error correcting module 1946. The data/information 1934 includes user data 1947, terminal Identification (ID) information 1948, received information 1 1950, received information N 1952, transmit information 1 1954, transmit information N 1956, identified MTU information 1958, segment information 1960, quality information 1962, and base station ID info 1964.

User data 1947 includes data to be transmitted to the base station 1800 and data received from base station 1800, and intermediate data, e.g., data involved in the decoding process of recovering detected information. Transmit information 1 1954 may include a set of information that may correspond to a first signal, e.g., a regular or underlying signal, information defining the transmission block of MTUs that may be used to transmit the first signal, information defining a first set of MTUs that will be used to define the signal, information that would be modulated on the first set of MTUs to define the first signal, information defining which MTUs corresponding to first signal information that shall be transmitted to e.g., a base station 1800. In some embodiments each of the MTUs conveying the first set of information data will be transmitted to the base station 1800. In other embodiments, most of the MTUs conveying first set of information shall be transmitted to the base station 1800. Transmit information N 1956 may include a set of information that may correspond to a second signal, e.g., a flash signal, information defining the transmission block of MTUs that may be used to transmit the second signal, e.g., to a base station, information defining a second set of MTUs that will be used to define the second signal, information that should be modulated on the second set of MTUs to define the second signal. Received info 1 1950 includes a first set of recovered information from receiver 1, 1902, e.g., information corresponding to a first set of base station pre-transmission information. The first set of recovered information may have been recovered, e.g., from a regular or underlying signal. Received info N 1952 includes a second set of recovered information from receiver N, 1904, e.g., information corresponding to a second set of base station pre-transmission information. The second set of recovered information may have been recovered, e.g., from a flash signal.

The regular and flash signal defining each original pre-transmission set of information share some common MTUs. Identified MTU information 1958 may include a set of identified MTUs in the second or flash signal, the set of identified MTUs may have been obtained by receiver N's decoder 1920. Identified MTU information 1958 may be forwarded to receiver 1 1902, where the receiver 1902 can exclude those MTUs before passing the received signal to the error correcting module in the decoder 1918, or alternatively, the identified MTU info 1958 may be forwarded to the error correcting module 1946 in memory and/or the correcting module in decoder 1918.

Terminal ID information 1948 is a base station assigned ID. Base station ID information 1964 includes information, e.g. a slope value, that may be used to identify a specific base station to which the wireless terminal 1900 is connected. Using the base station ID information 1964 and the terminal ID 1948, the wireless terminal can determine the data and control hopping sequences. Quality information 1962 may include information from detected pilots, downlink channel quality measurements and reports, interference levels, power information such as current transmission level and battery energy level, SNR, etc. Quality information 1962 may be fed back to the base station 1800 for use in classifying the receiver as "stronger" or "weaker" receivers, to assist the base station 1800 in its scheduling and allocation including assigning regular or underlying segments and flash segments in accordance with the present invention. Segment information 1960 may include information defining the segments allocated to the user in terms of usage type, e.g., traffic channel, assignment channel, request channel; characteristics, e.g., MTUs, frequency/phase and time OFDM tones-symbols; type of signals to use for segment, e.g. regular or underlying vs. flash.

Communications routine 1936 includes various communications applications which may be used to provide particular services, e.g., IP telephony services, text services and/or interactive gaming, to one or more end node users.

Wireless terminal control routines 1938 control the basic functionality of the wireless terminal 1900 including the operation of the transmitters 1910, 1912, and receivers 1902, 1904, signal generation and reception including data/control hopping sequences, state control, and power control. Wireless terminal control routines 1938 also control and implement the new features and improvements of the present invention including the generation and transmission of combined signals, the receiving of combined signals, separation of the combined signal into regular or underlying signal information and flash signal information, separation and recovery of information Transmitter control module 1940 may use data/info 1934 including transmit info 1 1954, transmit info N 1956, terminal ID 1948, user data 1947, and segment info 1960 to generate the transmission signals and control the operation of the transmitters 1910, 1912 in accordance with the invention. For example, transmitter control module 1940 may control transmitter 1910 to encode via its encoder 1922 sets of information included in transmit 1 info 1 1954 into a regular or underlying signal which transmitter 1 1910 may transmit. Transmitter control module 1940 may control transmitter N 1912 to encode via its encoder 1924 sets of info included in transmit info N 1956 into a flash or protected signal using the set of MTUs corresponding to the information in info 1956. Alternately, in various embodiments of the transmitters 1910, 1912, a single transmitter may be used which internally combines or mixes the signal based upon the transmit info 1 1954 and the transmit info N 1956 under the direction of the transmitter control module 1844. Such mixing operation may involve superimposing regular and flash signaling prior to transmission and/or selectively forming one MTU transmission set including each of the elements of the flash signal and the elements in the regular signal not included in the flash signal.

Receiver control module 1942 controls the operation of receivers 1902, 1904 to receive a combined signal and extract two sets of information, e.g., receiver 1 info 1950, and receiver info N 1952, in accordance with the invention. The reception process under control of the receiver control module 1942 may include control of decoders 1918, 1920 and control of the other elements within the receivers. In some embodiments, the receiver control module 1942 controls impulse noise filters, background noise filters, and error detection modules with the receivers 1902, 1904. In some embodiments, the receiver control module 1942 controls the $2^{nd}$ signal MTU identification module in one receiver, e.g., receiver N 1904, and the discarding module in another receiver, e.g., receiver 1 1902, and conveys identified MTU information 1858 from receiver N 1904 to receiver 1 1902; this allows receiver 1 1902 to remove MTUs that include flash signal information, from the information stream entering the error correcting module that is attempting to recover the regular signal information set.

Error correction module 1946 works in conjunction with or in place of an error correction module that may be included in the receivers 1902, 1904. The error detection and correction capability included in the receivers 1902, 1904 and/or module 1846 allows the wireless terminal 1900 to reconstruct sets of information corresponding to pre-transmission sets of information, even though the (regular or underlying) signal representing the pre-transmission set of information has been affected by the superposition of a second flash signal (flash signal) or the punch through, e.g. replacement of some MTU(s), by a second signal (flash signal).

Figure 1:
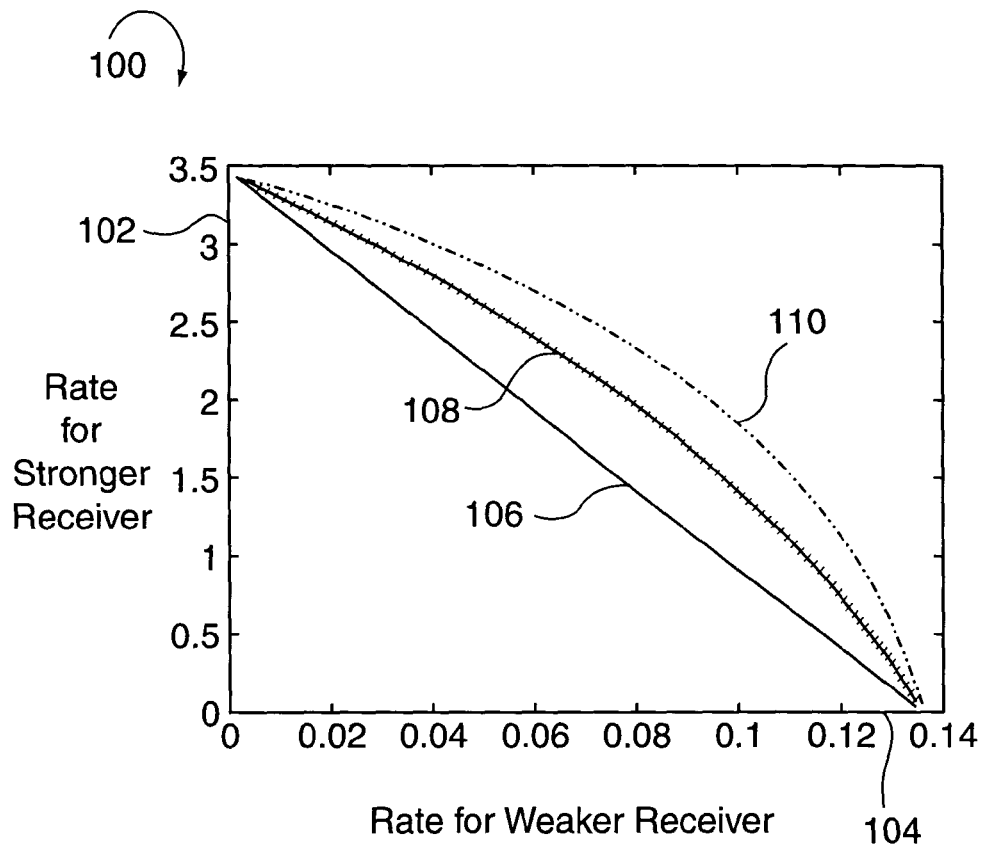
FIG. 1 shows a graph illustrating achievable rates in a broadcast channel for a first user with a stronger receiver and a second user with a weaker receiver under three different transmission strategies.
Figure 2:
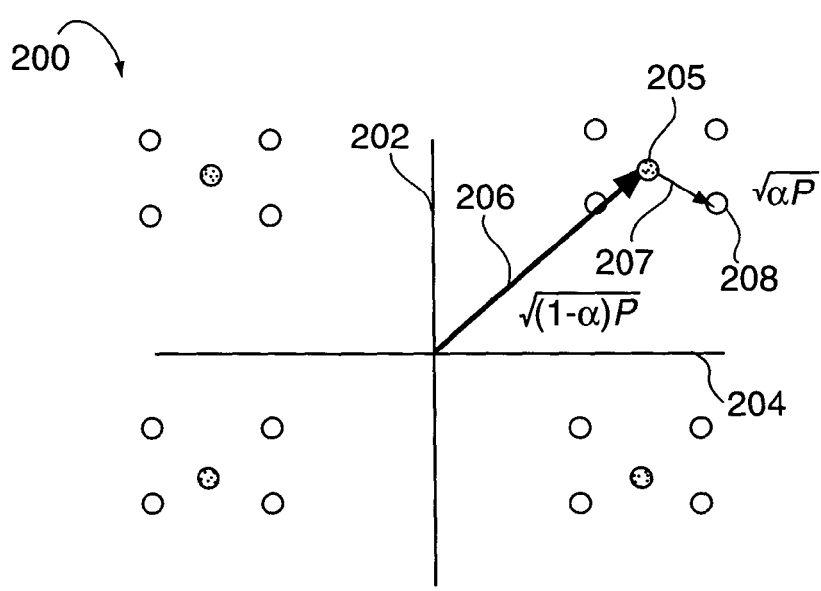
FIG. 2 illustrates an example of superposition coding with QPSK modulation.
Figure 3:
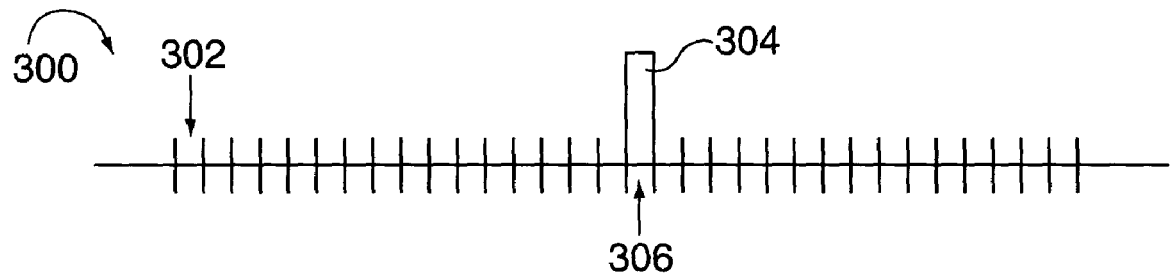
FIG. 3 illustrates an example of pulse position modulation.

On-off keying is a modulation technique in which the transmitter concentrates its energy along a subset of the degrees of freedom occupied by the codeword. For example, pulse position modulation is one illustration of on-off keying in which the transmitter uses energy only in those positions where a '1' is communicated, and is shut off when a '0' is communicated. Pulse position modulation can communicate log 2(M) bits by concentrating energy in one of M positions. An additional bit can be communicated by using positive and negative pulses. An example of pulse position modulation is illustrated in FIG. 3. FIG. 3 shows a drawing 300 with 32 slots, e.g. exemplary individual slot 302. The energy is concentrated in $17^{th}$ slot 306 and is represented by a pulse 304. In FIG. 3, 5 bits of information may be communicated using the 32 locations or slots, if the pulse 304 may only be in one direction, e.g. positive. In FIG. 3, 6 bits of information may be communicated using the 32 locations or slots if the pulse 304 can be positive or negative. In general, information may be communicated in two ways in a generalization of on-off keying—firstly, the location of the energy within the degrees of freedom occupied by the codeword, and secondly, the information contained in the signals which occupy that location. For instance, if the channel can be estimated at the mobile with the aid of a reference signal, information may be encoded in the phase and/or amplitude in addition to information encoded in the location of the energy of the generalized on-off signal. This form of generalized on-off keying will be referred to in the remainder of this document as flash signaling. Typically, the concentration of energy is restricted to a small subset of the available degrees of freedom in the flash signaling paradigm.

Flash signaling may be used in accordance with the invention. Simple examples of flash coding in accordance with the present invention shall be described. Consider one embodiment of the invention applied to a digital communication system that uses BPSK signaling. In the example considered here, suppose that the airlink resource comprising 16 symbols. For example, in the exemplary spread spectrum OFDM multiple access system, the 16 airlink resource symbols can be 16 orthogonal tones in one OFDM symbol period, or one tone in 16 OFDM symbol periods, or any proper combination of tones and symbol periods (e.g., 4 tones in 4 OFDM symbol periods).

Figure 4:
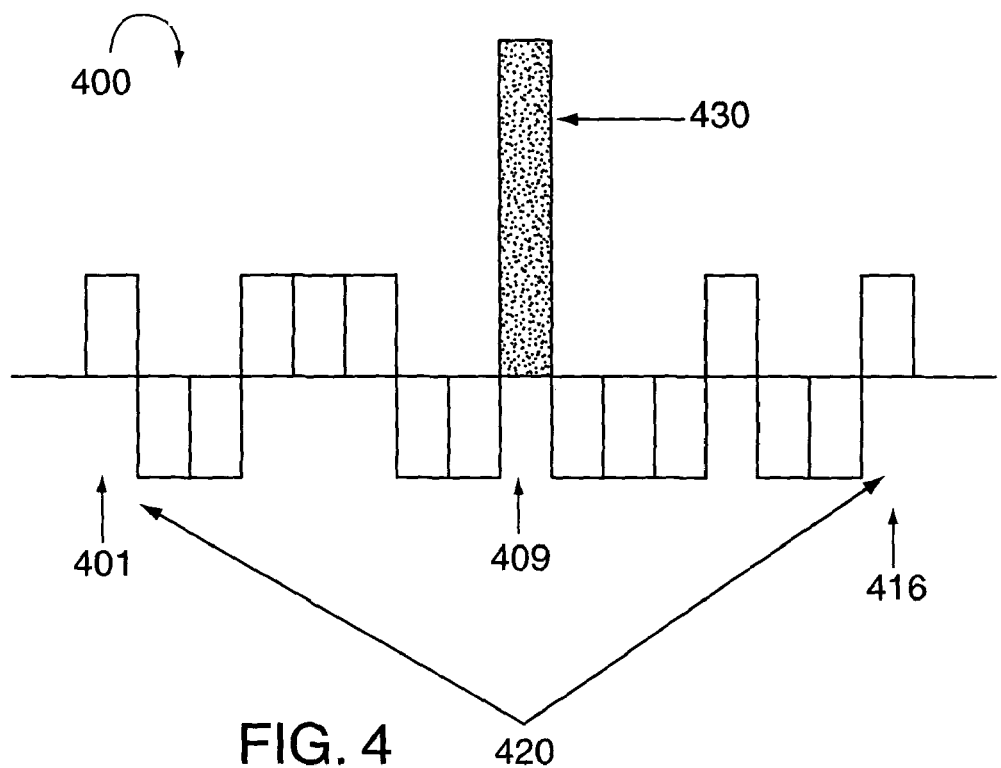
FIG. 4 illustrates an example of flash superposition coding, in accordance with the present invention.

In FIG. 4, the superimposed signal 400 includes a regular signal 420 which is communicated using a codeword whose energy spans all 16 BPSK symbols, as illustrated in FIG. 4 by small rectangles with no shading. The regular codeword can be constructed using, for example, a convolutional code. Suppose that the protected signal is required to communicate 5 information bits. In this embodiment, the 5 protected bits can be communicated using the position of a high-energy symbol 430 as illustrated in FIG. 4 by a single larger rectangle with shading. The protected signal comprises one BPSK symbol 430 transmitted at high power, while the regular signal 420 with energy distributed over 16 symbols is superposed on it. Note that the BPSK symbol of the protected signal can be in any of the 16 distinct symbol positions. For reference, $1^{st}$ symbol 401 and $16^{th}$ symbol 416 are identified in FIG. 4. For example, in FIG. 4, the BPSK symbol is transmitted on the $9^{th}$ symbol. Therefore, the symbol position conveys 4 bits of the 5 protected information bits. In addition, the phase (e.g., sign) of the BPSK symbol conveys the $5^{th}$ protected bit.

To see the advantage of this coding scheme of the present invention over the classical supposition coding scheme, reconsider the design of the stronger receiver. The stronger receiver can use an idea of successive decoding. The stronger receiver first decodes the protected signal, or, alternatively, then subtracts it from the composite received signal, and finally decodes the regular signal, or alternatively, signals the weaker signal receiver to discarddiscard the tones on which the larger signal is detected. Note with the new coding scheme of the present invention, even if the cancellation is not perfect, the damage to the regular codeword is limited to one or a few symbols and therefore the receiver can minimize the adverse impact of the damage. For example, in the decoding procedure, the receiver may ignore the symbol that is occupied by the regular signal. In this case, the operation of cancellation is reduced to causing erasure at a particular symbol location with the possibility that the error correction codes can be used to correct for the loss.

In the above example of FIG. 4, each BPSK symbol of the 16 airlink resource symbols represents a degree of freedom. The regular signal distributes its energy in all the 16 degrees of freedom. Meanwhile, each codeword of the protected signal concentrates its energy in one of the 16 degrees of freedom. Note that the flash signal, as defined in the above embodiment, is an orthogonal code. However, the invention is not contingent on any orthogonality properties of the codewords.

Transmitter design for use with coding implemented in accordance with the present invention shall be described. The example above illustrates aspects and methods of the invention, which may be implemented and utilized in various communications systems. This method of superposing signals by concentrating the energy of the protected signal among a small subset of the available degrees of freedom, while distributing the energy of the regular signal among substantially all the available degrees of freedom, is called flash superposition coding in this document. The protected codeword is denoted as the 'flash signal', and the regular codeword is denoted as the "regular signal" or "underlying signal", in this discussion. While, in general, the approach is to transmit the protected information using the flash signal and the regular information on the regular signal, this may, in some embodiments of the invention, be reversed.

Flash signaling, in accordance with the invention, provides a way of superposing signals that allows superposition coding gains to be robustly realized in practical receivers. In general, the flash signal and the regular signal are communicated using the same set of transmission resources. However, each codeword of the flash signal concentrates its energy on a small subset of the available degrees of freedom. Each codeword of the regular signal may spread its energy over each of the available degrees of freedom. In order that the flash signal be detected and decoded easily, it is desirable that its energy be higher, in some embodiments the energy is significantly higher, than that of the regular signal in the selected subset of the degrees of freedom corresponding to the flash signal. This relatively higher concentration of energy in the selected flash subset is feasible even when the total energy of the regular signal is higher than the total energy of the flash signal. Finally, in order that the regular signal be detected and decoded easily, the impact of the flash signal on the regular codeword should be minimal. In other words, the loss of energy in the selected subset of the degrees of freedom occupied by the flash signal should have small impact on the decoding of the regular codeword.

The selection of transmit powers on the flash signal and the regular signal depends on several factors including (a) the SNR of the target receivers of both the flash and regular signals; (b) the information rates conveyed on the flash and regular signals; and (c) the method of construction of codes on the flash and regular signals. In general, the powers may be chosen independently to meet their own robustness and coding performance requirements. Moreover, the flash signaling can be carried out in an opportunistic manner for maximum flexibility. Specifically, the transmitter can opportunistically choose not to transmit the flash signal and use most of its available power to transmit the regular signal. Alternatively, the transmitter may choose to opportunistically transmit the flash signal with most of its available power and choose not to transmit the regular signal.

Receiver design for use with coding implemented in accordance with the present invention will now be discussed. In one embodiment of the invention, the receiver first decodes the flash signal. The flash signal is detectable at the receiver since it is received at much higher power than the regular codeword in a small subset of the degrees of freedom. The receiver then cancels the impact of the flash signal before attempting to decode the regular codeword. In the case of classical superposition coding, cancellation involves decoding the protected codeword and subtracting it from the composite received signal. In flash superposition coding, in one embodiment the receiver completely discards the signal received in the subset of the degrees of freedom of the decoded flash signal codeword when the receiver is to decode the regular signal. As the regular signal distributes its signal energy in all the degrees of freedom, the erasure of the signal energy in a small subset of the degrees of freedom should have little or negligible performance implications on the decoding of the regular codeword due to the error detection and correction capability of the decoder.

In another embodiment of the invention, the receiver does not explicitly cancel the flash signal before it decodes the regular signal. Instead, the receiver directly decodes the regular signal from the composite received signal, which may include the flash signal. The receiver uses soft metrics coupled with saturation and reversal limits. Consequently, the flash signal serves to saturate or substantially erase signal components in the subset of the degrees of freedom that it occupies, but has negligible impact on the performance of decoding the regular codeword. Moreover, if the receiver is not interested in the flash signal, the receiver may just decode the regular signal without decoding the flash signal, in which case the receiver may not be even aware of the presence of the flash signal which may be interpreted and/or treated as impulse or background noise.

A control channel embodiment of the present invention shall be discussed below. In this section, an embodiment of the invention as applied to a control channel of the exemplary system will be described. The control channel in this example carries information from a base station 1702 over the downlink broadcast channel to a plurality of mobile users 1708, 1710 in a cellular wireless system 1700 as shown in FIG. 17. In most cellular wireless systems, control channels are transmitted at broadcast power since they are constrained by the mobile users with the weakest channels. Flash signaling is well suited for this application in this scenario and results in significant power reduction with no or little loss in robustness.

It is assumed that the information carried on the control channel can be separated into multiple subsets, each meant for one or more subset of mobile users in the system. In this example, we will assume that the control channel information can be partitioned into two subsets. The first subset is denoted 'regular information' and is intended for those mobile users who experience moderate to high downlink SNR. The second subset, denoted 'protected information,' is intended for a subset of users who experience very low downlink SNR.

In the example considered here, the airlink resource is assumed to comprise 32 symbols. For example, in the exemplary spread spectrum OFDM multiple access system, the airlink resource can be 32 orthogonal tones in one OFDM symbol period, or one tone in 32 OFDM symbol periods, or any proper combination of tones and symbol periods (e.g., 4 tones in 8 OFDM symbol periods).

Figure 5:
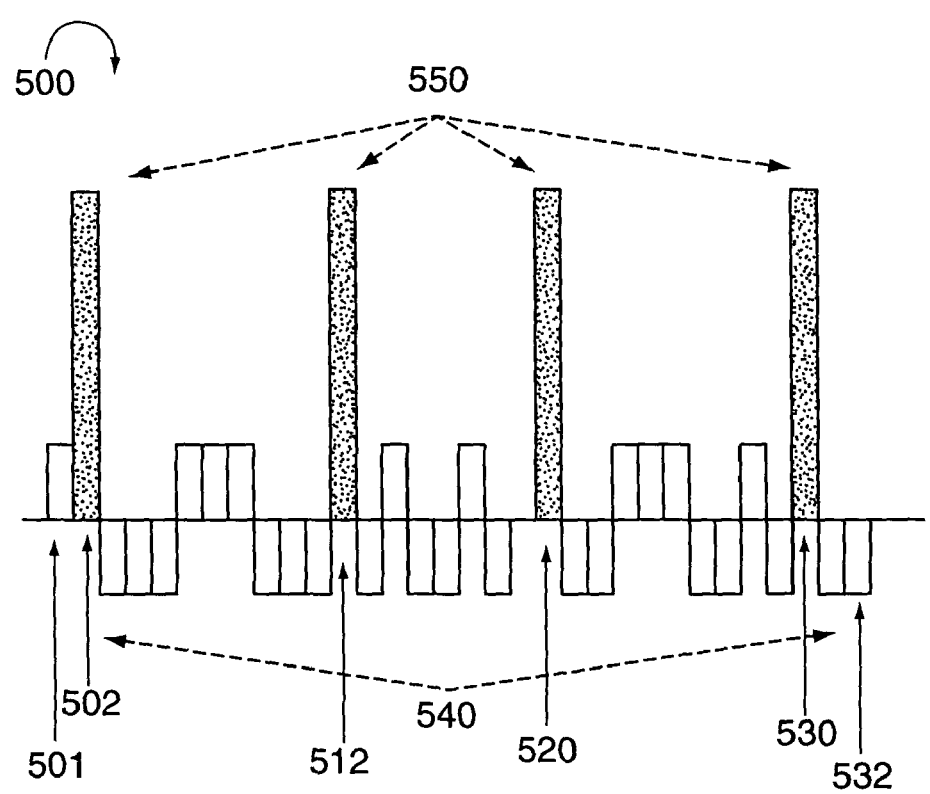
FIG. 5 illustrates another example of flash superposition coding, in accordance with the invention, in which the flash signal concentrates its energy on 4 symbol locations.

As illustrated in superimposed signal 500 of FIG. 5, the regular information 540 represented by small rectangles with no shading, in this example is transmitted using a codeword of 32 symbols. First symbol location 501 and 32nd symbol location 532 are shown for reference. This codeword is transmitted at a power that is sufficient to be decoded by the subset of users who experience moderate or high SNR. The low SNR users are unlikely to be able to decode this codeword, and hence the power requirements are much lower than they would have been if the codeword had to be decoded by each of the mobile users. This difference in ability to decode the codeword is especially true in a wireless environment, where mobile users can experience SNR that varies by several orders of magnitude. The protected information, which is intended for a subset of low SNR mobile users, is transmitted using a flash signal 550 as illustrated in FIG. 5 and represented by 4 large rectangles with shading. In this embodiment, each protected codeword is assumed to concentrate its energy in 4 symbol locations 502, 512, 520, 530. The sets of 4 symbol locations are assumed to be non-overlapping in this example, which results in 8 orthogonal sets, each of which include 4 symbol locations. In general however, the codeword sets may overlap partially or completely in other constructions. Concentrating the energy of the protected codeword on more than one symbol location is valuable from the viewpoint of providing diversity in cellular wireless systems and affords a greater degree of protection against channel fading and interference.

In the example of FIG. 5, each protected codeword set communicates 3 bits through its location alone. Let k to be the index of the 8 different airlink resource symbol sets. Suppose the 32 airlink resource symbols are indexed from 0 to 31. For k=0, . . . , 7, the airlink resource symbols of k-th symbol set location are symbols k, k+8, k+16, and k+24.

When a flash signal codeword includes multiple symbols, additional information bits can be communicated using those symbols. Let {q0,q1,q2,q3} denote the four symbols to be transmitted with the four airlink resource symbols of any one of the eight airlink resource symbol sets. In one embodiment, {q0,q1,q2,q3} can be constructed with 4 Walsh codes of length 4 as tabulated in Table 1. The selection of q0, q1, q2, or q3 results in an additional 2 bits being conveyed through the choice of the 4 codewords.

This information can be decoded at the mobile receiver in a straightforward manner. The mobile receiver can identify the location of the flash signal because of its higher energy, which serves to identify the 3 bits of symbol set locations. It then extracts the symbols that comprise the flash signal and decodes the remaining 2 bits. This example of codeword construction results in the codewords possessing an unequal error protection property. The bits that are resolved by the location of the flash signal are received with high reliability. This is especially true when a flash signal is communicated over a wireless channel since only one of the four symbol locations needs to be received to specify the codeword set. The detection of q0, q1, q2, or q3 may be more susceptible to errors from channel fading or interference. Alternatively, the receiver may employ a more sophisticated decoder, such as maximum likelihood decoder, to decode the flash signal in its entirety. Once again, this invention is not contingent on the use of orthogonal codes on the flash signals as illustrated in this example.

This concept can be extended in a straightforward manner to multi-dimensional modulation sets as well. For example, if BPSK modulation were to be used, one more bit can be sent with the phase (i.e., sign) of the flash signal codeword. Furthermore, if QPSK modulation were to be used, additional one bit can be sent with the selection of either in-phase or quadrature signaling.

TABLE 1

Construction of orthogonal codes on flash signals

| Codeword Index | {q0, q1, q2, q3} bit values |
|---|---|
| 0 | {+, +, +, +} |
| 1 | {+, +, −, −} |
| 2 | {+, −, +, −} |
| 3 | {+, −, −, +} |

Figure 6:
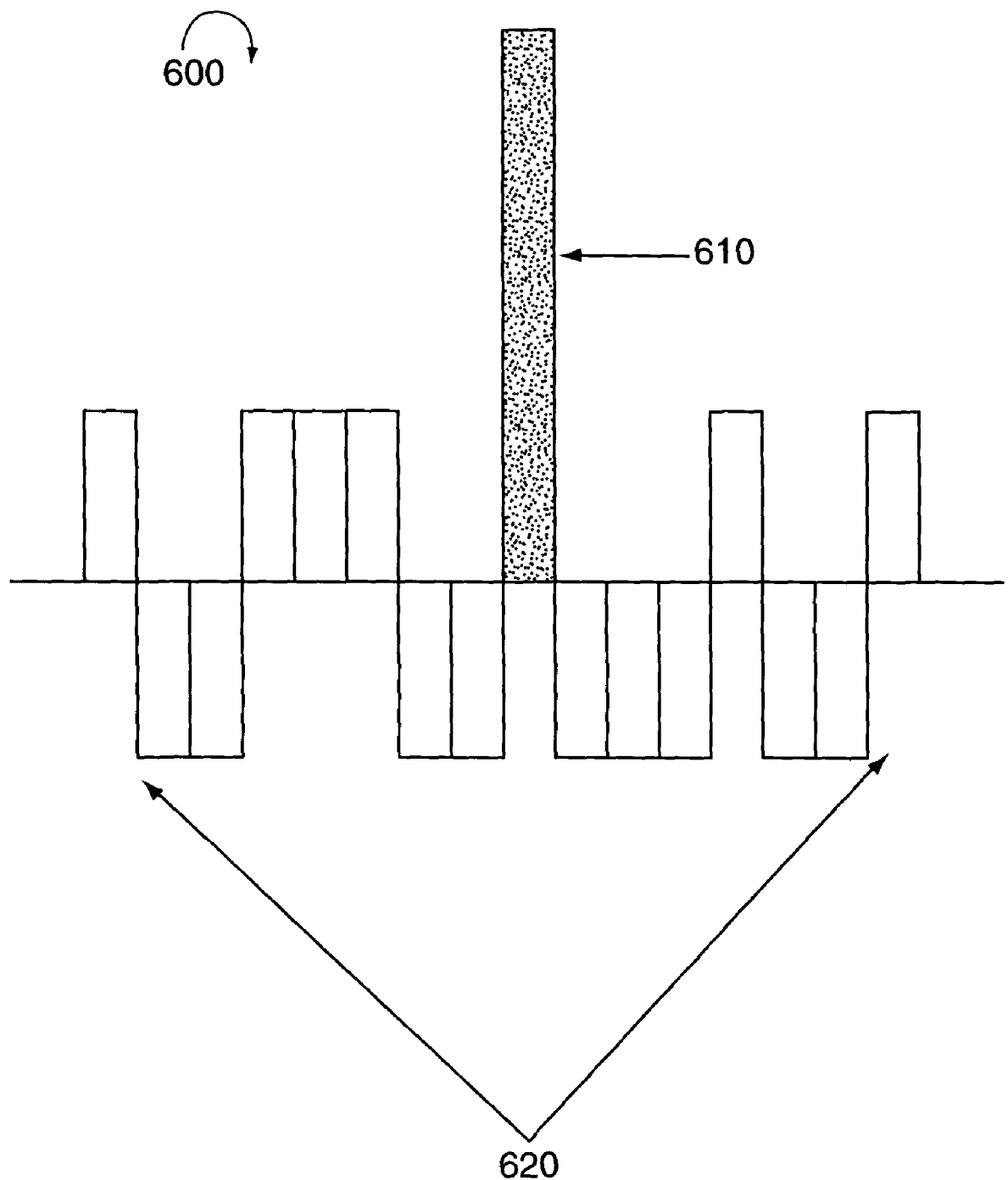
FIG. 6 illustrates exemplary flash superposition coding in a multiple-access channel shown as a composite signal at a base station receiver in accordance with the present invention.

Flash signaling in multiple-access channels will now be described, in accordance with the present invention. While the invention has been described thus far in a broadcast channel paradigm, it is also applicable in a multiple-access channel framework. This aspect of the invention will be described in the context of the cellular uplink of the exemplary system, which is a multiple-access channel. Consider a base station receiver that is receiving signals from two mobile transmitters on the uplink. Since the base station 1702 is also the coordinating entity, it can differentiate between the two transmitters in a relative sense. Suppose that the mobile transmitter that operates over a channel with lower path loss is designated as the 'stronger' transmitter, and the other transmitter, which experiences higher path loss, is considered a 'weaker' transmitter. The base station instructs the weaker transmitter to transmit its signal by distributing the energy of the signal across each of the degrees of freedom, while the stronger transmitter is instructed to concentrate its transmit energy in a few degrees of freedom. The composite received signal 600 at the base station receiver 1802 is illustrated in FIG. 6. The base station receiver 1802 can easily decode and cancel out the flash signal 610, represented by a large rectangle with shading, transmitted from the "stronger" transmitter before decoding the weak signal 620, represented by small rectangles with no shading, transmitted from the "weaker" transmitter.

The categorization of mobile transmitters as 'stronger' or 'weaker' is not static and is a relative definition, allowing for flexibility within the system. The notion of mobile transmitters as being 'stronger' or 'weaker' may be associated to other criteria in place of or in addition to the path loss experienced on the uplink channel. This labeling or categorization of "stronger" or "weaker" mobile transmitter is in some embodiments could be applied in the context of the interference cost in the cellular uplink. For instance, a mobile transmitter that results in high uplink interference in other cells may be considered to be a 'weaker' transmitter and may hence be instructed by the base station to transmit its signal by distributing energy across each of the degrees of freedom. On the other hand, a mobile transmitter which has low interference cost due to its location may be considered a 'stronger' transmitter, and can use flash superposition coding to superpose its signal on that of the 'weaker' transmitter. Alternatively, in some embodiments, mobile transmitters can be categorized as 'stronger' or 'weaker' based on device constraints such as battery power or state.

Flash signaling in an exemplary system shall be described in accordance with the methods and apparatus of the present invention. In an exemplary wireless data communication system, the air link resource generally includes bandwidth, time and power. The air link resource that transports data and/or voice traffic is called the traffic channel. In the exemplary system, data is communicated over the traffic channel in traffic channel segments (traffic segments for short). Traffic segments may serve as the basic or minimum units of the available traffic channel resources. Downlink traffic segments transport data traffic from the base station to the wireless terminals, while uplink traffic segments transport data traffic from the wireless terminals to the base station. In the exemplary system, a traffic segment includes of a number of frequency tones over a finite time interval.

Figure 7:
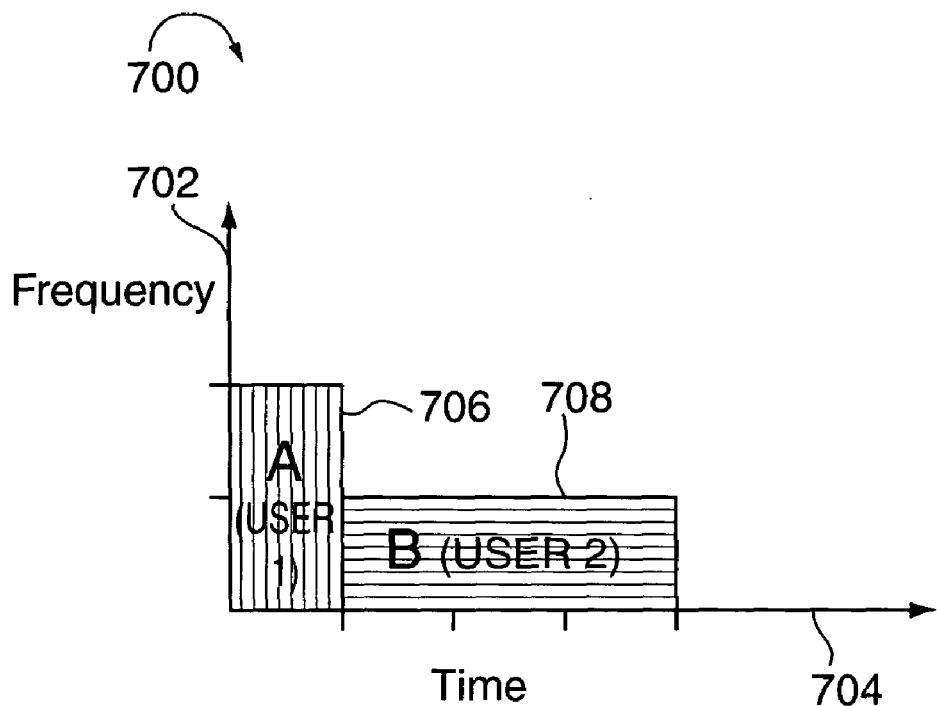
FIG. 7 illustrates exemplary traffic segments and the allocation of traffic segments by a base station to a user.
Figure 8:
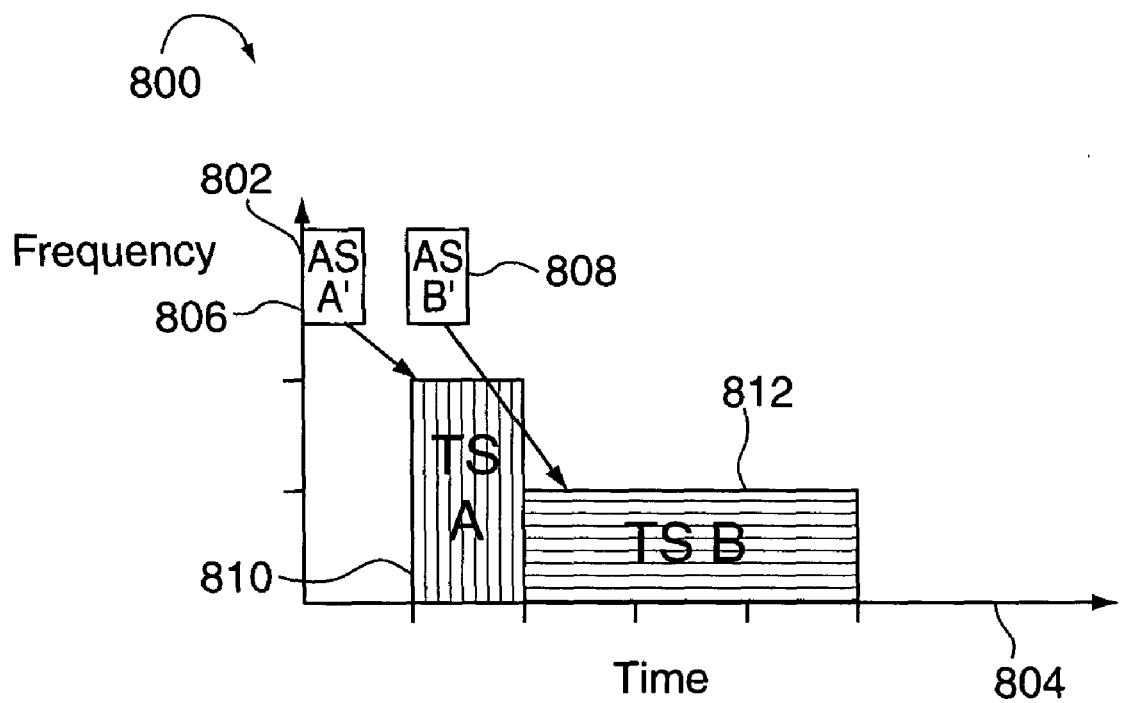
FIG. 8 illustrates exemplary assignment segments corresponding to traffic segments.

In the exemplary system used to explain the invention, the traffic segments are dynamically shared among the wireless terminals 1708, 1710 that are communicating with the base station 1702. A scheduling function, e.g., module 1838 in the base station 1800 assigns each uplink and downlink segment to one of the mobile terminals 1708, 1710 based on a number of criteria. The allocation of traffic segments can be to different users from one segment to another. For example, in FIG. 7 in a graph 700 of frequency on vertical axis 702 vs. time on horizontal axis 704, segment A 706, shown with vertical line shading, is assigned to user #1 by the base station scheduler and segment B 708 shown with horizontal line shading is assigned to user #2. The base station scheduler can rapidly assign the traffic channel segments to different users according to their traffic needs and channel conditions, which may be time varying in general. The traffic channel is thus effectively shared and dynamically allocated among different users on a segment-by-segment basis. In the exemplary system, the assignment information of traffic channel segments is transported in the assignment channel, which includes a series of assignment segments. In a cellular wireless system, such as the system 1700 shown in FIG. 17, assignment segments are generally transmitted in the downlink. There are assignment segments for downlink traffic segments, and separate assignment segments for uplink traffic segments. Each traffic segment is associated with a unique assignment segment. The associated assignment segment conveys the assignment information of the traffic segment. The assignment information may include the identifier of the user terminal(s), which is assigned to utilize that traffic segment, and also the coding and modulation scheme to be used in that traffic segment. FIG. 8 includes a graph 800 with a vertical axis 802, representing frequency and a horizontal axis 804 representing time. FIG. 8 shows two assignment segments, assignment segment A' (AS A') 806 and assignment segment B' (AS B') 808, which convey the assignment information of traffic segments A (TSA) 810 and B (TSB) 812. The assignment channel is a shared channel resource. The users, e.g., wireless terminals, receive the assignment information conveyed in the assignment channel and then utilize the traffic channel segments according to the assignment information.

Data transmitted by the base station 1702 on a downlink traffic segment is decoded by a receiver in the intended wireless terminal 1708, 1710 while data transmitted by the assigned wireless terminal 1708, 1710 on the uplink segment is decoded by a receiver in the base station 1702. Typically the transmitted segment includes redundant bits that help the receiver determine if the data is decoded correctly. This is done because the wireless channel may be unreliable and data traffic, to be useful, typically has high integrity requirements.

Figure 9:
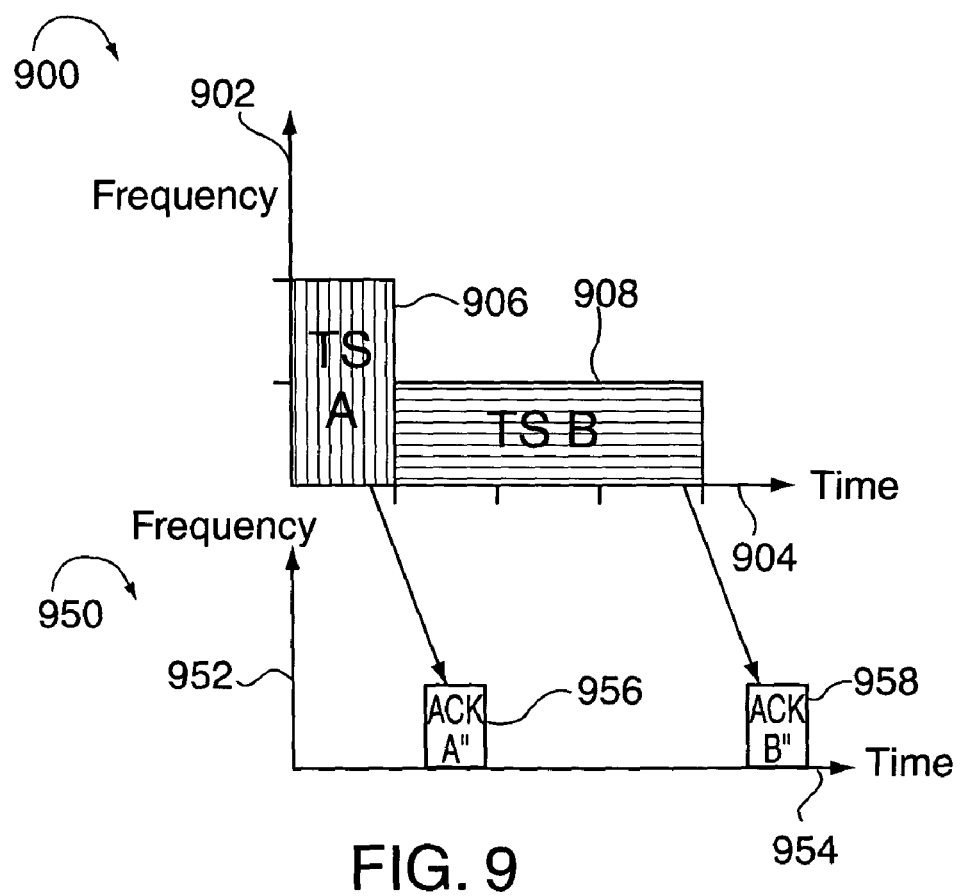
FIG. 9 illustrates exemplary downlink traffic segments, and acknowledgement segments.

Because of the interference, noise and/or channel fading in a wireless system, the transmission of a traffic segment may succeed or fail. In the exemplary system, the receiver of a traffic segment sends an acknowledgment to indicate whether the segment has been received correctly. The acknowledgment information corresponding to traffic channel segments is transported in the acknowledgment channel, which includes a series of acknowledgment segments. Each traffic segment is associated with a unique acknowledgment segment. For a downlink traffic segment, the acknowledgment segment is in the uplink. For an uplink traffic segment, the acknowledgment segment is in the downlink. At the minimum, the acknowledgment segment conveys one-bit of information, e.g., a bit, indicating whether the associated traffic segment has been received correctly or not. Because of a predetermined association between uplink traffic segments and acknowledgement segments, there may be no need to convey other information such as the user identifier or segment index in an acknowledgment segment. An acknowledgment segment is normally used by the user terminal, e.g., wireless terminal 1708, 1710 that utilizes the associated traffic segment and not other user terminals. Thus, in both the links (uplink and downlink) the acknowledgment channel is a shared resource, as it can be used by multiple users. However, there is generally no contention that results from the use of the shared acknowledgment channel, as there is generally no ambiguity in which user terminal is to use a particular acknowledgement segment. FIG. 9 shows a graph 900 of downlink traffic segments including a vertical axis 902 representing frequency, a horizontal axis 904 representing time, a first traffic segment, traffic segment (TS) A 906 and a second traffic segment TSB 908. FIG. 9 also shows a second graph 950 of uplink acknowledgment (ACK) segments including a vertical axis 952 representing frequency and a horizontal axis 954 representing time. FIG. 9 further shows two uplink acknowledgment segments, A" 956 and B" 958, which convey the acknowledgment information of downlink traffic segments A 906 and B 908 from the wireless terminal 1708 to the base station 1702.

As described above, the exemplary system 1700 may be a packet-switched cellular wireless data system with traffic segments allocated dynamically by the base station 1702 on the downlink as well as the uplink. The application of the invention to the exemplary system 1700 is now described in the context of the cellular downlink. Assume that the base station 1702 can assign up to two traffic segments at a time in a time-slotted manner. The choice of the users for whom these segments are intended is broadcast on an assignment channel. Further assume without loss of generality that one of the two users operates at a lower SNR than the other user. In this context, the two users are regarded as mutually 'stronger' and 'weaker'.

Figure 10:
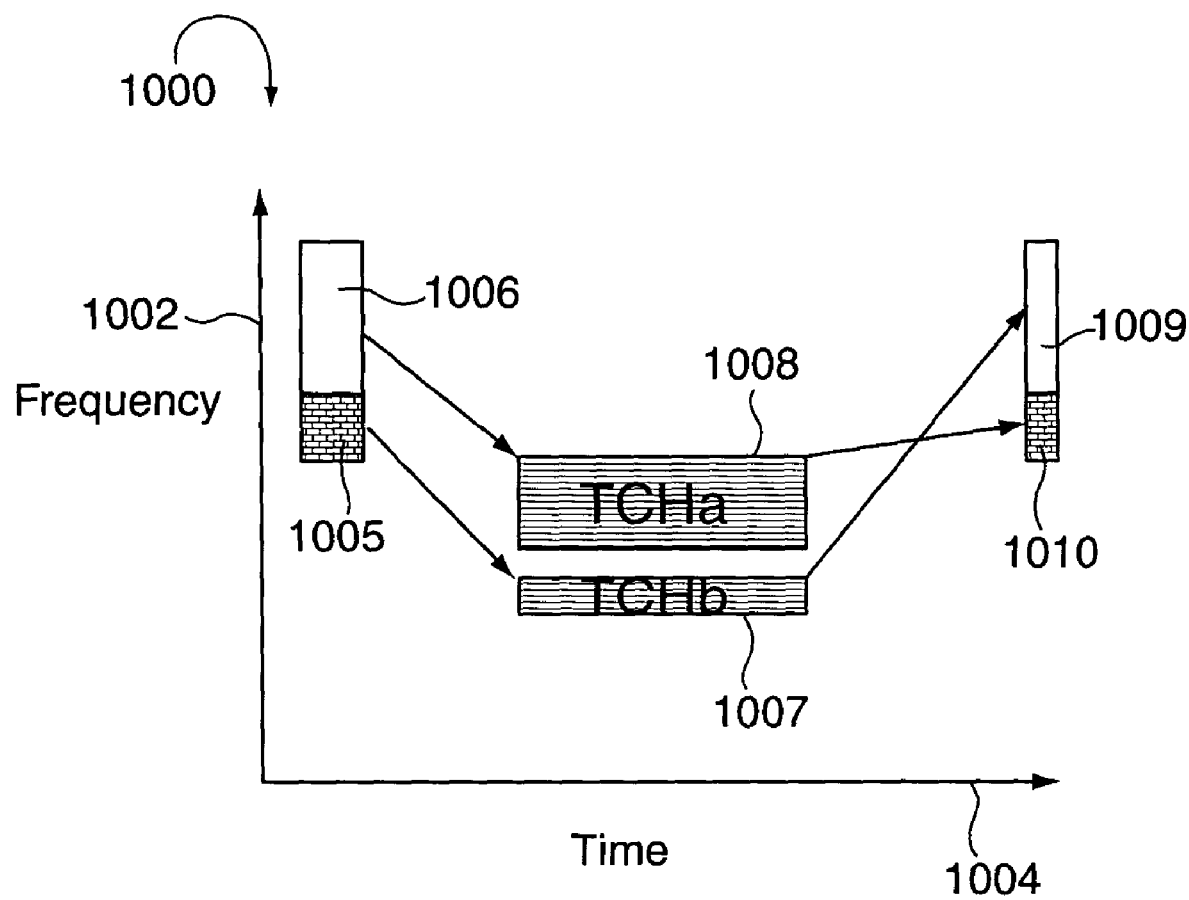
FIG. 10 illustrates exemplary assignment segments, downlink traffic segments, and acknowledgement segments, where the assignment and acknowledgement segments each use flash superposition coding in accordance with the present invention.

The graph of FIG. 10 illustrates frequency on vertical axis 1002 vs. time on the horizontal axis 1004. FIG. 10 also include an A (regular) assignment segment (ASG) 1006, an A traffic channel segment (TCHa) 1008, an A (flash) acknowledgement segment (ACKf) 1010, a B flash assignment segment (ASGf) 1005, a B traffic channel segment (TCHb) 1007 and a B acknowledgment segment (ACKr) 1009. ASGf 1005 is within the frequency spectrum of ASGr 1006. ACKf 1010 is within the frequency spectrum of ACKr 1009.

As illustrated in FIG. 10, the assignment information for the stronger user, (ASGr), 1006 is transmitted using the regular signal on the assignment channel, while the information, (ASGf), 1005 for the weaker user is communicated using the flash signal. The stronger receiver learns from its (regular) assignment that it is receiving a traffic segment, denoted TCHa 1008, while the weaker receiver is similarly notified of its corresponding traffic segment, denoted TCHb 1007, through the flash signaled assignment (ASGf) 1005. In the exemplary system, the mobile receivers 1708, 1710 provide a feedback acknowledgement on the uplink to the base station 1702 to indicate the status of the received traffic segment.

The two mobile users 1708, 1710 can use flash signaling to superpose their acknowledgement signals as shown in FIG. 10. For this purpose, the 'stronger' receiver on the downlink is assumed to be the stronger transmitter on the uplink and hence communicates its acknowledgement using a flash signal (ACKf) 1010. The weaker receiver distributes the energy of its acknowledgement signal over each of the degrees of freedom and communicates it to the base station 1702 as a regular signal (ACKr) 1009.

The capacity implication to cellular wireless systems is discussed with respect to flash signaling. Cellular wireless systems are typically interference-constrained and their capacity is dependent on the amount and the characteristics of ambient interference. The use of flash signaling has a very important effect on interference levels. It is a well-known information theoretic result that among all noise signals with the same energy, Gaussian noise results in the lowest capacity. Flash signals, by virtue of their construction, are peaky and highly non-Gaussian in nature. Hence, given the same total amount of interference, when one cell in a wireless system uses flash signals, the impact of these signals (as interference) on other cells is less than it would have been with Gaussian-like signals. This applies for the uplink as well as downlink paths of cellular wireless systems.

Figure 11:
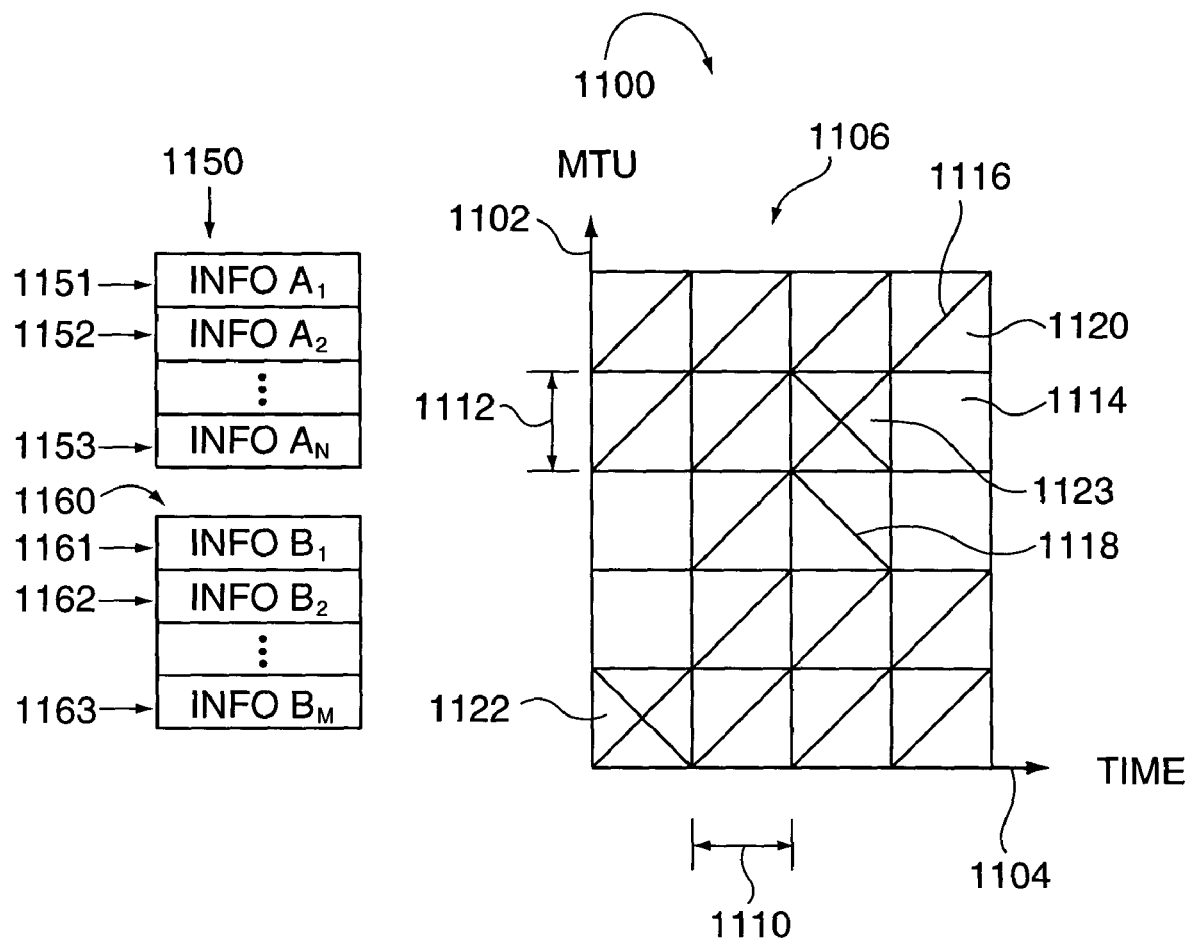
FIG. 11 illustrates 2 exemplary sets of information, a transmission block of minimum transmission units (MTUs), and sets of minimum transmission units, partially overlapping, that may be used to define the sets of information and may be used in part or whole to transmit signals to convey the information, in accordance with the present invention.

FIG. 11 illustrates two exemplary set of information, a first set of information 1150 and a second set of information 1160 that may be transmitted using a transmission block, in accordance with the present invention. The first set of information 1150 includes information $A_1$ 1151, information $A_2$ 1152, information $A_N$ 1153; the second set of information 1160 includes information $B_1$ 1161, information $B_2$ 1162, information $B_M$ 1163. First set of information may be, e.g., user data, assignments, or acknowledgements. Second set of information may be, e.g., user data, acknowledgements or assignments. FIG. 11 also shows a graph 1100 of minimum transmission units (MTU), where the vertical axis represents frequency tones and the horizontal axis 1104 represents time. In FIG. 11, each small box refers to a specific MTU unit, e.g. division 1112, represents 1 degree of freedom which can be used to transmit information. Each slot on the horizontal axis, e.g., slot 1110 represents the time to transmit a MTU, e.g., an OFDM symbol time. Each square in FIG. 11, e.g. exemplary square 1114 represents an MTU unit. Each MTU corresponds to a unique combination of resources used for the transmission of information, said combination of resources including at least two of time, frequency, phase, and spreading code. In an OFDM system, a MTU may be frequency or phase over time, e.g., an in-phase or quadrature component in an OFDM tone-symbol. In a CDMA system, an MTU unit may be, e.g., a spreading code assigned for a unit of time. An exemplary transmission block 1106 shown in FIG. 11 is the set of 24 MTUs. The information for the first set of information 1150 is defined over a first set of minimum transmission units. The first set of minimum transmission units is identified by those squares with a diagonal line 1116 ascending from left to right. The exemplary first set of MTUs includes 15 MTUs, e.g., exemplary MTU 1120 is in the first set of MTUs. The first set of MTUs includes at least a majority of the MTUs in the transmission block 1106, in accordance with the invention. In some embodiments, the first set of MTUs includes at least 75% of the MTUs in the transmission block 1106. The example of FIG. 11 is such as embodiment which includes 15 first set MTUs/20 block 1106 total number of MTUs=75%. The information for the second set of information 1160 is defined over a second set of minimum transmission units. The second set of minimum transmission units is identified by those squares with a diagonal line 1118 descending from left to right. The second exemplary set of minimum transmission units includes 3 MTUs. In accordance with the invention, the second set of MTUs includes less MTUs than the first set of MTUs, and some of the MTUs in the first and second sets of MTUs are the same. For example, in FIG. 11, 2 MTUs are included in both sets, MTU 1122 and MTU 1123. In some embodiments, the second set of MTUs has less than half the number of MTUs of the first set of MTUs; FIG. 11 is an illustration of such as embodiment. The information in the first and second sets of information 1150, 1160, may be communicated, e.g., from a base station 1702 to a wireless terminal 1708, 1710, using minimum transmission units included in first and second sets of minimum transmission units.

Figure 12:
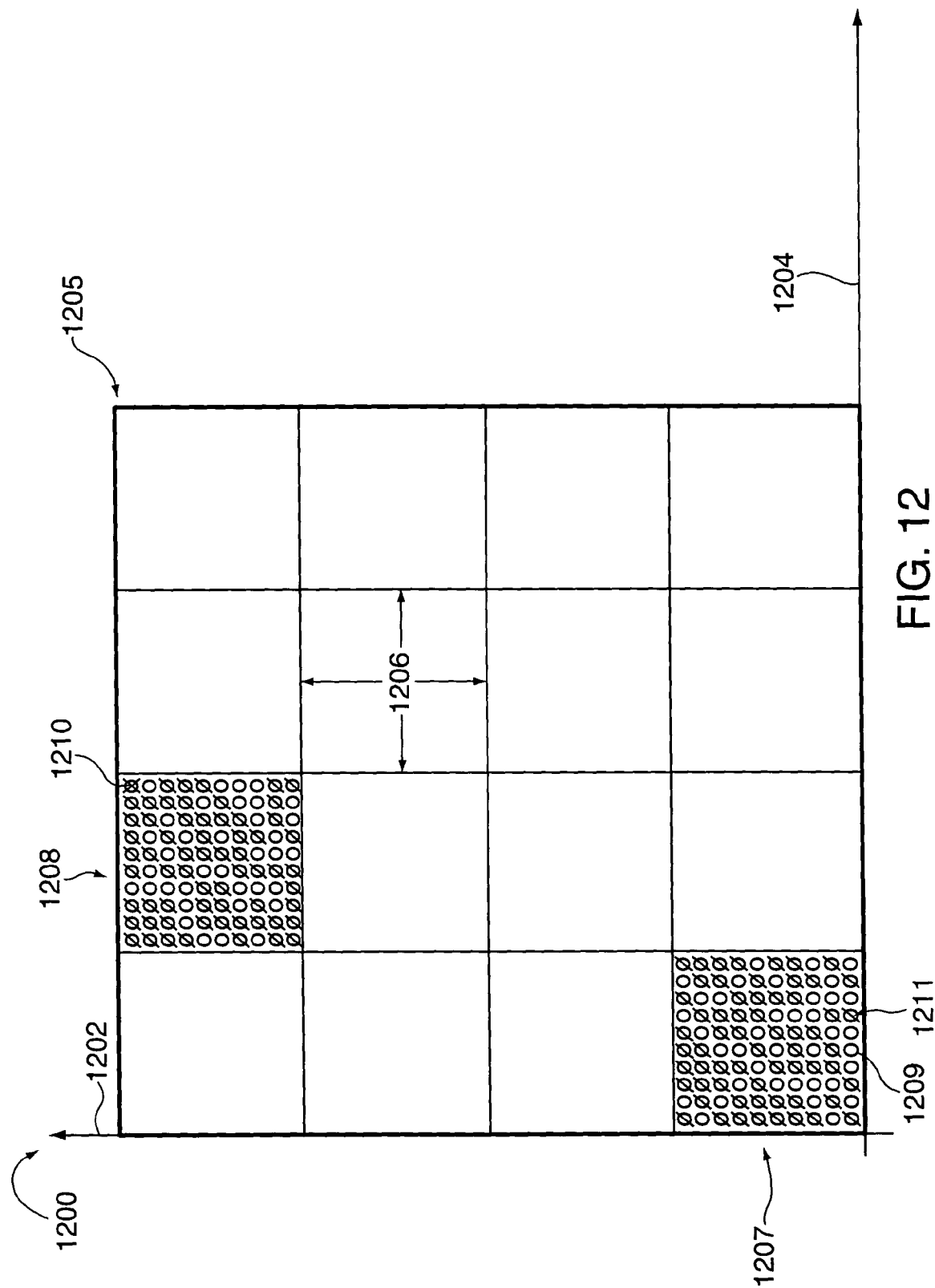
FIG. 12 illustrates another exemplary transmission block of MTUs illustrating that the transmission block may be sub-divided into sub-blocks in accordance with the present invention.

FIG. 12 shows a graph 1200 of minimum transmission units (MTU) on the vertical axis 1202 vs. time on the horizontal axis 1204. FIG. 12 shows an exemplary transmission block 1205 including 1600 MTUs. A first set of information may be represented by a first set of MTUs including a majority of the 1600 MTUs in the transmission block 1205. The transmission block 1205 may, in accordance with the invention, be subdivided into sub-blocks. In FIG. 11, the transmission block 1205 of MTUs is divided into 16 sub-blocks of MTUs, each subset including 100 MTUs. Each small square, e.g., exemplary square 1206, encloses a sub-block of MTUs. In some embodiments, the first set of MTUs may be subdivided into small sets of information, each set represented by a first set MTUs within an individual sub-block. In combination, the small sets of information represent a first set of information that is coded over a majority of the large transmission block 1205. Exemplary sub-block 1207 illustrates 100 typical MTUs of an exemplary sub-block Exemplary sub-blocks 1208 illustrates 100 typical MTUs of another sub-block. The individual MTUs of the other sub-blocks of the transmission block 1205 are not shown, but each of the other sub-blocks may be assumed to be similar to exemplary sub-block 1207. Each circle in a sub-block represents an MTU. Each diagonal line ascending from left to right intersecting a circle represents an individual MTU that is used to represent the information in the first set of information. Each diagonal line descending from left to right intersecting a circle represents an individual MTU that is used to represent the information in the second set of information. In FIG. 12, an exemplary MTU 1208 is one of the MTUs used to represent the first set of information; exemplary MTU 1211 is another of the MTUs used to represent the first set of information. Exemplary MTU 1209 is not used to represent information in either the first set or the second set of information in the particular case although it is within the exemplary transmission block 1205. That is, at the particular illustrated point in time, MTU 1209 is not used to carry signals corresponding to the first or second information sets. Exemplary MTU 1210 is used to represent information in both the first set of information and the second set of information.

In the example of FIG. 12, each sub-block, e.g. sub-block 1207 may be used to represent information uniquely representing a part of a first set of information being uniquely defined over the small sub-block of MTUs. However, the second set of information may represent a different set of information, e.g., 10-bit information. To convey the 10-bit information uniquely, $2^{10}=1024$ possible minimum transmission units may be required. Transmission block 1205 with 1600 possible minimum transmission units available may be used, and a single MTU allocated to represent a particular value of the 10-bit information. In this example, MTU 1210 is the one MTU used to convey the information of the second set of information when the information is transmitted. FIG. 12 represents a case where each of the MTUs included in the second set of MTUs is also included in the first set of MTUs.

Figure 13:
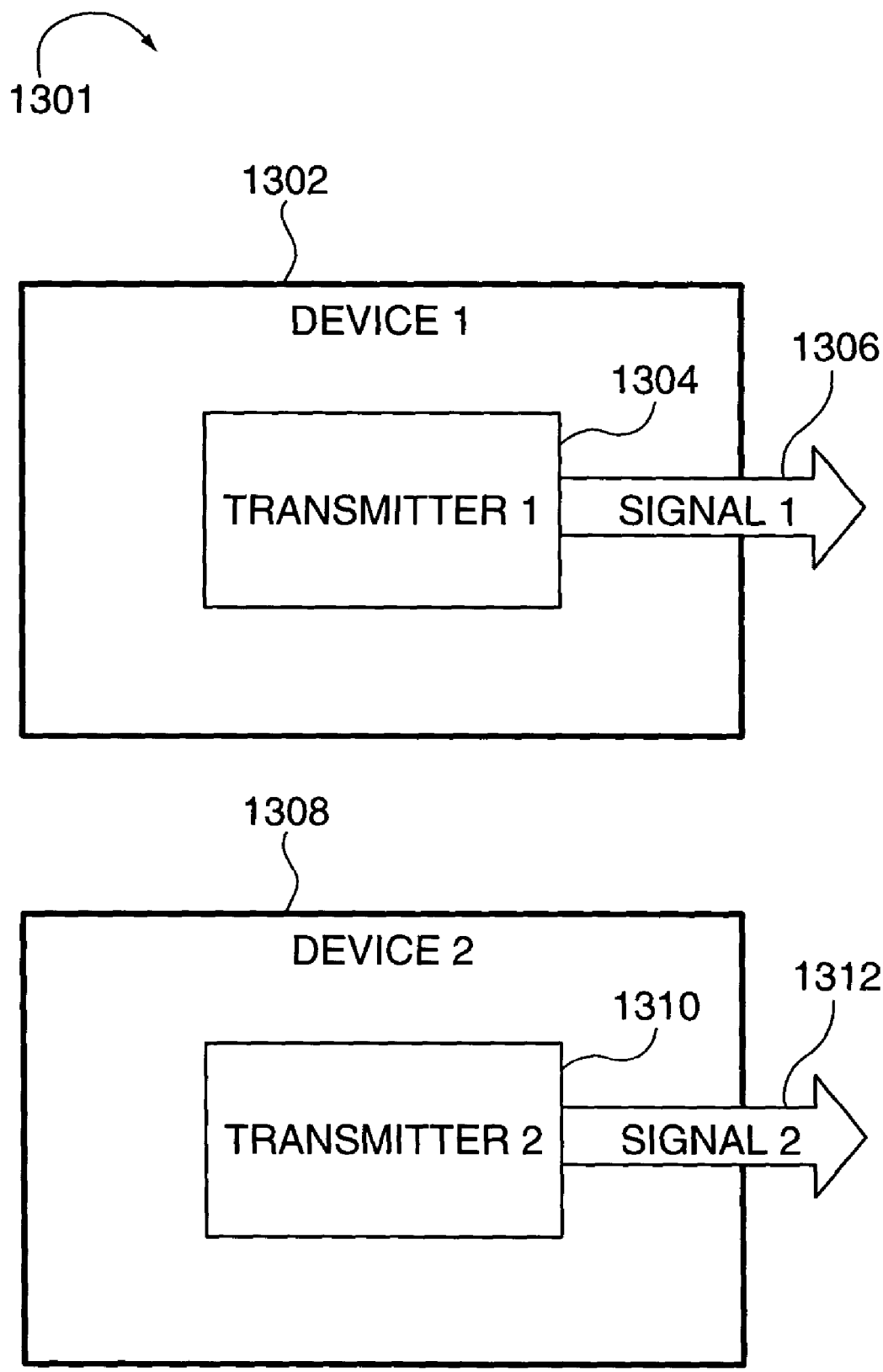
FIG. 13 illustrates one method of transmitting two signals corresponding to the two sets of information using different devices with different transmitters, each transmitter generating a signal corresponding to one set of information, in accordance with the present invention.

FIG. 13 1301 illustrates one method for transmitting two sets of information, e.g. sets of information 1150 and 1160 of FIG. 11, in accordance with the invention. FIG. 13 includes a first device, e.g. device 1 1302 including a transmitter, transmitter 1, 1304, and a second device, e.g., device 2 1308 including a transmitter, transmitter 2 1310. Each device maybe, e.g., a base station or a wireless terminal of the type shown in FIG. 17. The first set of information 1150 is communicated by signals, e.g. signal 1 1306, transmitted from transmitter 1 1304. Signal 1 1306 is sometimes referred to as the underlying or regular signal. The second set of information 1160 is communicated by signals, e.g. signal 1 1312, transmitted from transmitter 2 1310. Signal 2 is sometimes referred to as the flash signal. In the exemplary case of FIG. 13, signal 1 1306 would use the first set minimum transmission units, while signal 2 1312 would use the second set minimum transmission units. Some of the first set MTUs transmitted by transmitter 1 1304 would be the same as some of the second set MTUs resulting in some superposition of signal 1 1306 and signal 2 1312.

Figure 14:
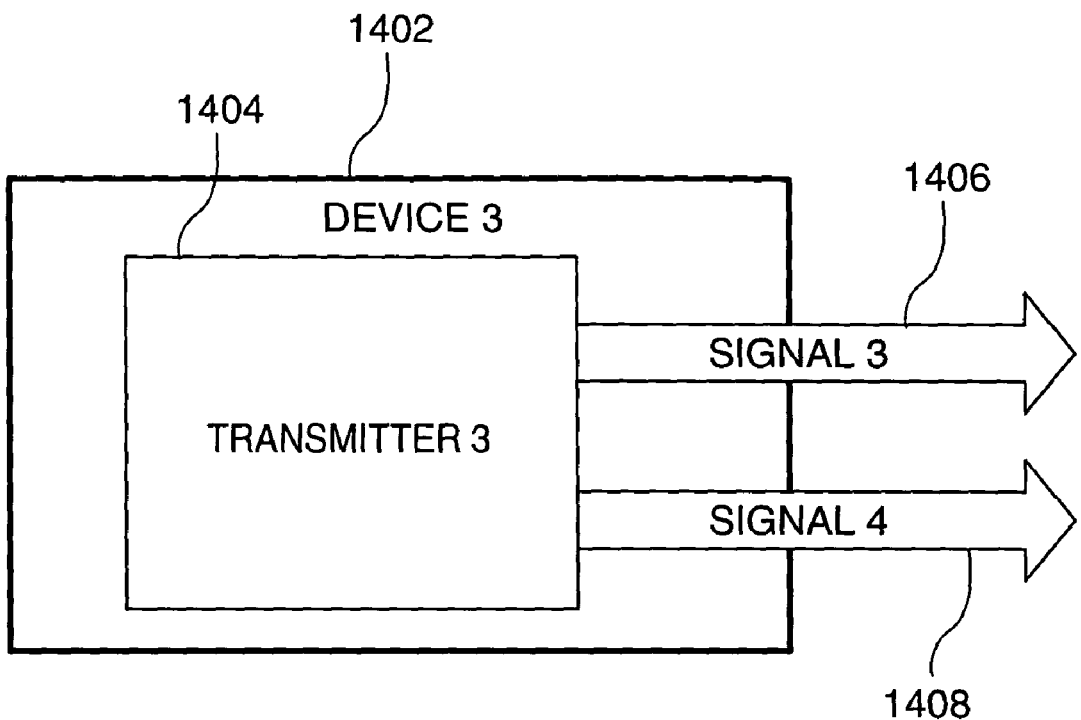
FIG. 14 illustrates two other methods of transmitting the two sets of information using either a single transmitter which outputs two signals, each signal corresponding to information in one set of information or using a single transmitter which internally combines the signaling to output a single combined signal in accordance with the present invention.
Figure 14:
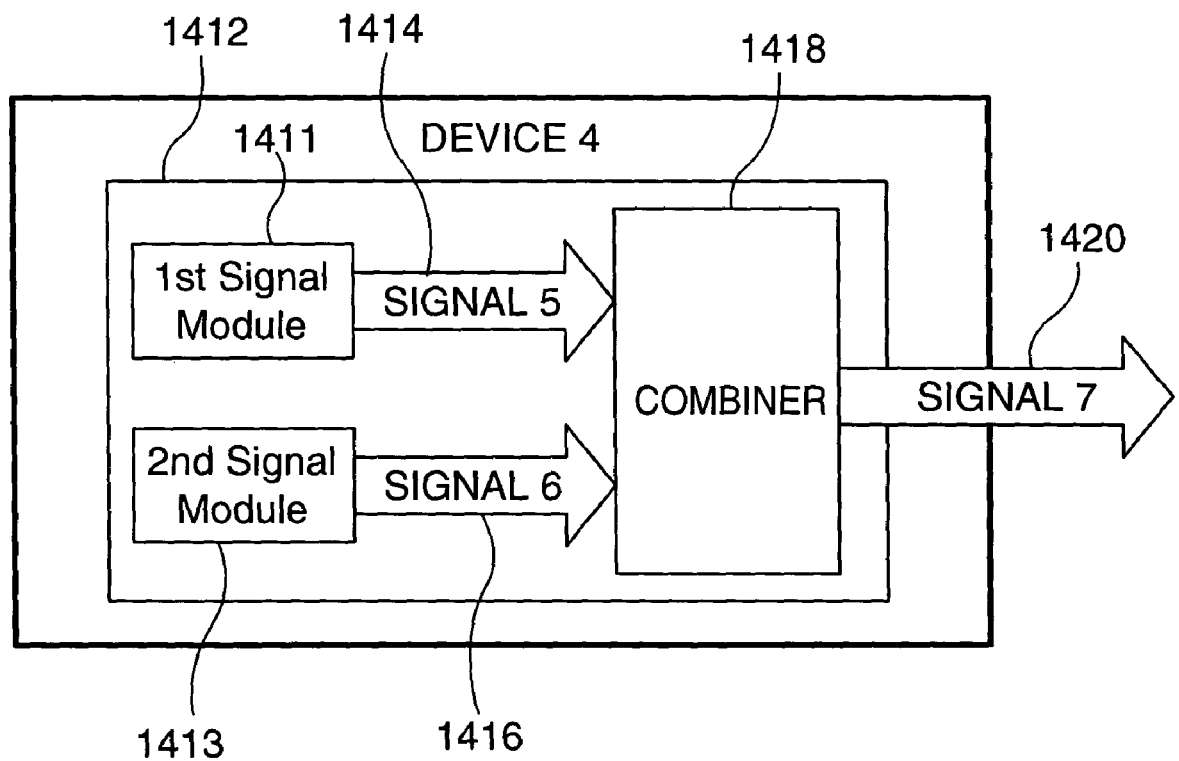

FIG. 14 illustrates two methods for transmitting two sets of information, e.g., sets of information 1150 and 1160 of FIG. 11, in accordance with the invention. In the first method described in FIG. 14, an exemplary device 3 1402, e.g., a base station or a wireless terminal, includes a transmitter, transmitter 3 1404 capable of transmitting signals corresponding to both first and second sets of information 1150, 1160 respectively. In FIG. 14, signal 3 1406 corresponds to first set of information 1150 and uses a first set of MTUs, while signal 4 1408 corresponds to second set of information 1160 and uses a second set of MTUs. Signal 3 1406 is sometimes referred to as the underlying signal or regular signal while signal 4 1408 is sometimes referred to as the flash signal. Signal 4 1408 is transmitted at a higher power level than signal 3 1406 on a per minimum transmission unit basis. In some embodiments, the power level at which signal 4 1408 is transmitted is at least 3 db greater than the power level at which the minimum transmission units corresponding to signal 3 1406 are transmitted. In some embodiments, the transmission power level of the minimum transmission units used to transmit signal 3 1406 may be varied. The transmission power level of the MTUs used to transmit signal 4 1408 may also be varied.

In the second method described in FIG. 14, an exemplary device, device 4 1410, e.g., a base station or wireless terminal includes a transmitter, transmitter 4 1412. Transmitter 4 1412 includes a 1$^{st}$ signal module 1411 and a second signal module 1413. The first signal module 1411 generates signal 5 1414 corresponding to the first set of information 1150. The second signal module 1413 generates signal 6 1416 corresponding to the second set of information 1160. Signal 5 1414 and signal 6 1416 are combined by combiner module 1418 prior to transmission of MTUs in signal 1420. Signal 5 1414 is sometimes referred to as the underlying or regular signal and signal 6 1416 is sometimes referred to as the flash signal. The combiner module 1418 can perform superposition of the two signals, signal 5 1414 and signal 6 1416. Alternately, the combiner module 1418 may compare the set of MTUs that would be used to transmit signal 5 1414 with the set of MTUs that would be used to transmit signal 6 1416. The combiner module 1418 can direct the information in signal 6 1414 into each of the MTUs requested; however, the module 1418 can exclude from the set of MTUs allocated for signal 5 1414 those MTUs already assigned to carry signal 6 1416. For example, in the FIG. 11 example, MTU 1122 and MTU 1123 could be excluded from carrying signal 5 1141 information. In this way the second set of information 1160 in signal 6 1416 punches through or replaces the first set of information 1150 in signal 5 1414 which would occupy the same MTU. This implementation assumes the receiver has error detection and correction capability sufficient to recover the original first set of information 1150, some of which was not transmitted. Thus, rather than using actual superposition, signals corresponding to the second set may be transmitted without being superimposed on signals of the first set with the overlapping first set signals being discarded prior to actual transmission. In such a case, the MTUs used to communicate the second set of information puncture the set of MTUs in the shared transmission block that were selected to transmit the first set of information.

Figure 15:
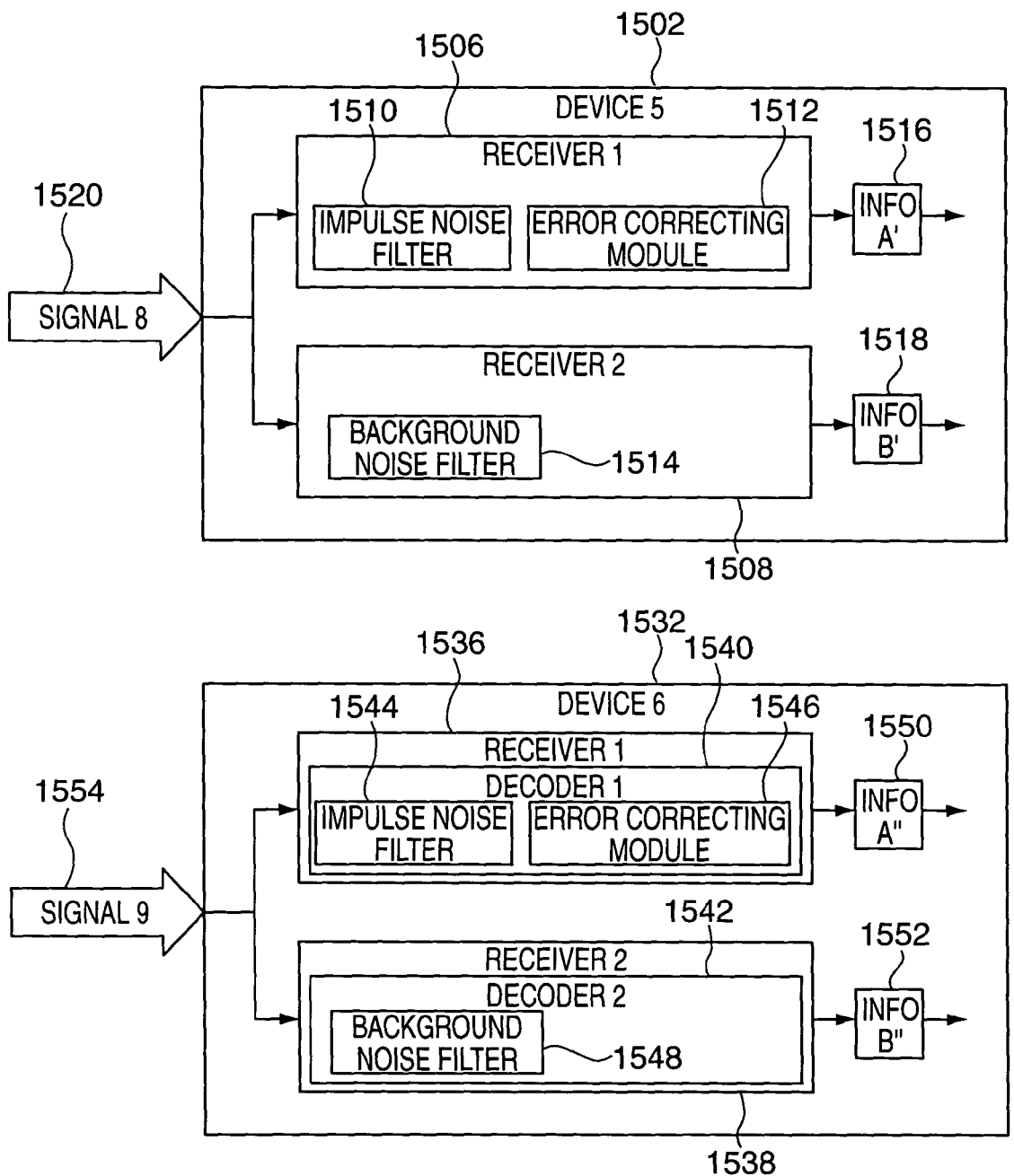
FIG. 15 illustrates two devices, in accordance with the present invention, including filtering and an error correcting module; each device includes two receivers, and each device may be used to receive a combined signal and retrieve the two sets of information which had been transmitted.

FIG. 15 illustrates an exemplary device, device 5 1502, e.g., a base station or a wireless terminal, which may be used to receive combined signals, in accordance with the invention, and obtain two set of received information, info A' 1516 and info B' 1518. Info A' 1516 is a recovered set of information corresponding to the first set of original pre-transmission information info A 1150 of FIG. 11. Info B' 1518 is a recovered set of information corresponding to the first set of original pre-transmission information info B 1160 of FIG. 11. Device 5 1502 includes a first receiver, receiver 1 1506 including an impulse noise filter 1510 and an error correcting module 1512. A combined signal, signal 8 1520 including signals that had been transmitted together over time, e.g., signal 3 1406 (regular of underlying signal) of FIG. 13 and signal 4 1408 (flash signal) of FIG. 13, is processed by receiver 1 1506 where the impulse noise filter 1510 filters out or rejects signal corresponding to MTU units derived from the second information set 1160. The remaining signal (regular signal) corresponding to most of the MTUs in the set of MTUs corresponding to the first information set 1150 is processed through the error correcting module 1512 which recovers the "lost information", and thus received set of info A' 1516 is an good representation of the pre-transmission set of information A 1150. Device 5 1502 also includes a second receiver, receiver 2 1508 including a background noise filter 1514. The combined signal 8 1520 also enters receiver 2 1508, where the background noise filter 1514 treats the signal corresponding to the first set of information 1150, e.g. signal 3 1406, as noise and removes or rejects this low level signal, leaving a signal (e.g., the flash signal) from which an good representation of pre-transmission second set of info B 1160 may be reconstructed as received information set B' 1518.

The second device, device 6, shown in FIG. 15 performs the combined signal reception and information retrieval similarly to device 5 1502. Device 6 1532 includes a first receiver, receiver 1 1540, and a second receiver, receiver 2 1538. Receiver 1 1536 includes a decoder, decoder 1 1540 including an impulse filter 1544 and error correcting module 1546. Receiver 2 1538 includes a decoder, decoder 2 1542 including a background noise filter 1548. Operation of device 6 1532 is similar to that described with respect to device 5 1502, except that additional decoding occurs in device 6 1532. During operation receivers 1536 and 1538 operate independently and in parallel. The first receiver 1536 treats the flash signal as impulse noise and rejects flash symbols as impulse noise or performs some other operation, e.g., a saturation operation, treating the flash component just as any other impulse noise signals might be treated. Receiver 2 1538 decodes the flash signal while treating the lower power signal as background noise. Combined signal 9 1554 is similar to combined signal 8 1520 including both regular and flash signals. Received information set A" 1550 corresponds to an a good reconstruction of the original pre-transmission first set of information A 1150 of FIG. 11. Received information set B" 1552 corresponds to a good reconstruction of the original pre-transmission second set of information B 1160 of FIG. 11.

Figure 16:
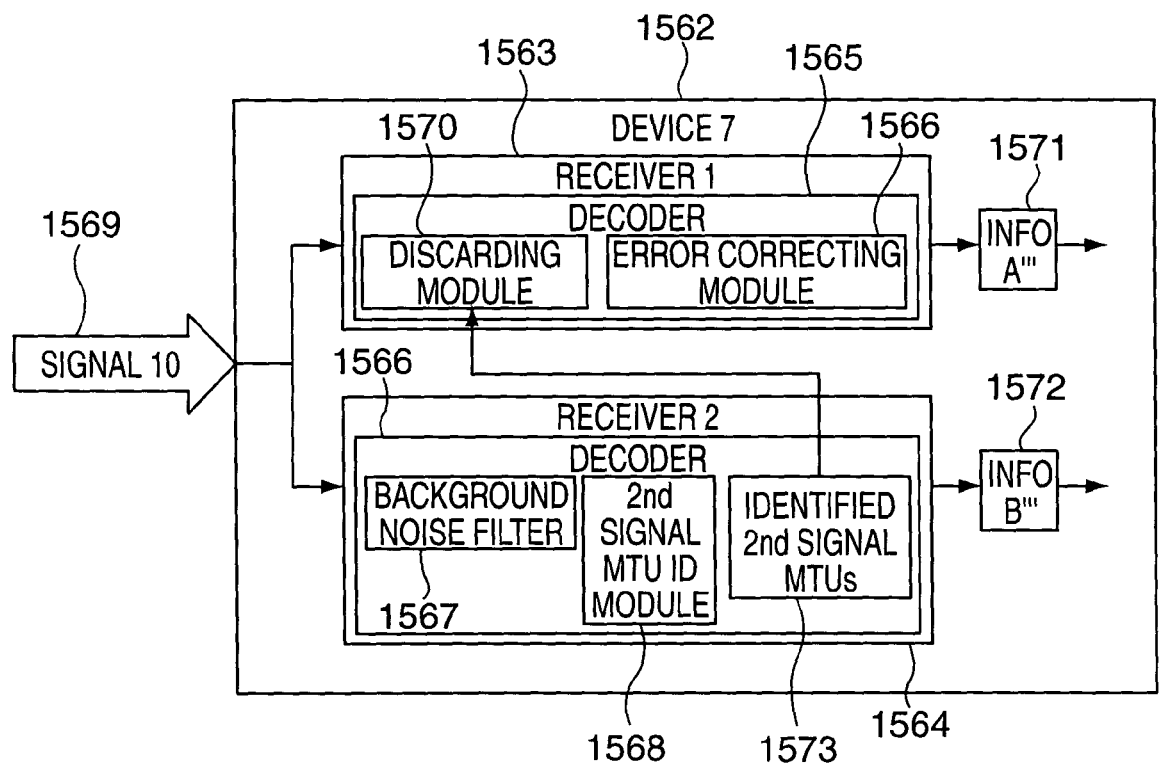
FIG. 16 illustrates another device, in accordance with the present invention, including an MTU signal identification module; said device includes two receivers, and said device may be used to receive a combined signal and retrieve two sets of information which had been transmitted.

FIG. 16 shows another exemplary device, device 7 1562, e.g. a base station or wireless terminal, including a first receiver, receiver 1 1563 and a second receiver, receiver 2 1564. Receiver 1 1563 includes a decoder 1565 including a discarding module 1570 and an error correcting module 1566. Receiver 2 1564 includes a decoder 1566 including a background noise filter 1567 and a $2^{nd}$ signal MTU identification module 1568. Combined signal 10 1573 is received and enters the receiver 2 1564. In the decoder 1566 of receiver 2 1564, the signal may be filtered by a background filter 1567 and the information decoded and output as a set of info B'" 1572, a reconstruction of the original pre-transmission set of info B 1160 of FIG. 11. In addition, the $2^{nd}$ signal MTU identification module 1568 identifies a set of MTUs 1569 corresponding to the second (flash) signal, and sends that information 1573 to the decoder 1565 of receiver 1 1563. In some embodiments, the identified set of MTUs 1573 are one of in-phase and quadrature components of tones at different symbol times.

The discarding module 1570 of the decoder 1565 in receiver 1 1563 receives the identified set of MTUs 1573 and rejects or removes the information derived from those MTU units before the information enters the error correcting module 1566. Alternately, the information identifying MTUs of the second or "flash" signal may be conveyed directly to the error correcting module 1566 which may remove the contribution from those MTUs. Set of information A'" 1571 corresponds to a reconstruction of the pre-transmission first set of information 1150 of FIG. 11. The discarding of identified MTUs and their contribution to the lower power signal is in sharp contrast to the prior art superposition decoding technique which requires the high power signal component to be accurately subtracted from a received signal unit before the underlying signal could be recovered.

While described in the context of an OFDM system, the methods and apparatus of the present invention, are applicable to a wide range of communications systems including many non-OFDM and/or non-cellular systems.

In various embodiments nodes described herein are implemented using one or more modules to perform the steps corresponding to one or more methods of the present invention, for example, signal processing, message generation and/or transmission steps. Thus, in some embodiments various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware, to perform one or more of the steps of the above-described method(s).

Numerous additional variations on the methods and apparatus of the present invention described above will be apparent to those skilled in the art in view of the above description of the invention. Such variations are to be considered within the scope of the invention. The methods and apparatus of the present invention may be, and in various embodiments are, used with CDMA, orthogonal frequency division multiplexing (OFDM), and/or various other types of communications techniques which may be used to provide wireless communications links between access nodes and wireless terminals. In some embodiments the base stations establish communications links with mobile nodes using OFDM and/or CDMA. In various embodiments the wireless terminals are implemented as notebook computers, personal data assistants (PDAs), or other portable devices including receiver/transmitter circuits and logic and/or routines, for implementing the methods of the present invention.

The techniques of the present invention may be implemented using software, hardware and/or a combination of software and hardware. The present invention is directed to apparatus, e.g., wireless terminals, base stations, communications system which implement the present invention. It is also directed to methods, e.g., method of controlling and/or operating wireless terminals, base stations and/or communications systems, e.g., hosts, in accordance with the present invention. The present invention is also directed to machine readable medium, e.g., ROM, RAM, CDs, hard discs, etc., which include machine readable instructions for controlling a machine to implement one or more steps in accordance with the present invention.

What is claimed is:

1. A method of communicating at least a first set of information and a second set of information, the method comprising:

defining a first set of transmission units for use in conveying said first set of information, said first set of transmission units including at least a majority of transmission units of a transmission block, said transmission block including a plurality of transmission units, each transmission resource unit corresponding to a unique combination of resources used for transmission of information, said resources including at least two of time, frequency, phase, and spreading code;

defining a second set of said transmission units for use in conveying said second set of information, said second set of transmission units including less transmission units than the first set, at least some of the transmission units in the first and second sets of transmission units being the same, said transmission units in said second set of transmission units being transmission units in said transmission block; and using at least one transmitter to transmit the first and second sets of information using transmission units included in said first and second sets of transmission units;

wherein using at least one transmitter to transmit the first and second sets of information includes using transmission units included in said first set of transmission units to transmit a first signal corresponding to the first set of information and using the transmission units in said second set of transmission units to transmit a second signal corresponding to the second set of information; and wherein said second signal is transmitted at a higher power level than said first signal on a per transmission unit basis, said power level at which the transmission units corresponding to the second signal are transmitted being at least 3 dB greater than the power level at which the transmission units corresponding to the first signal are transmitted.

2. The method of claim 1, wherein said information is at least one of user data and control information including at least one of acknowledgement information and assignment information.

3. The method of claim 1, wherein using at least one transmitter to transmit the first and second sets of information includes using a first transmitter and a second transmitter, said first set of information being transmitted from said first transmitter and said second set of information being transmitted from said second transmitter, said first and second transmitters being different.

4. The method of claim 3, wherein said first and second transmitters are mounted on different devices.

5. The method of claim 1, wherein using at least one transmitter to transmit the first and second sets of information includes transmitting signals corresponding to both said first and second sets of information from a single transmitter.

6. The method of claim 1, wherein said first set of transmission units includes at least 75% of the total number of transmission units in said transmission block.

7. The method of claim 6, wherein the second set of transmission units has less than half the number of transmission units of the first set of transmission units.

8. The method of claim 6, wherein each of the transmission units included in the second set of transmission units is also included in said first set of transmission units.

9. The method of claim 1,
wherein using at least one transmitter to transmit the first and second sets of information includes transmitting said second set of information using each transmission unit in said second set of transmission units, and
transmitting said first set of information using at least some of said first set of transmission units.

10. The method of claim 9, wherein said at least some of said first set of transmission units includes only transmission units not included in said second set of transmission units.

11. The method of claim 9, wherein said at least some of said first set of transmission units includes transmission units in said second set.

12. The method of claim 1,
wherein each transmission unit is a unique combination of transmission resources; and
wherein at least one of the transmission resources included in the unique combination of transmission resources that forms one of said transmission units, included in both said first and second sets of transmission units, is frequency or phase.

13. The method of claim 1, wherein said unique combination of transmission resources that forms said one of said transmission units, included in both said first and second sets of transmission units, further includes time.

14. The method of claim 1,
where transmitting the first and second sets of information includes transmitting: i) information corresponding to said first set of information and ii) information corresponding to said second set of information, on one of the transmission units which is in both said first and second sets of minimum transmission units.

15. The method of claim 1, wherein each transmission unit in said transmission block corresponds to a different unique combination of transmission resources.

16. The method of claim 15, wherein each transmission unit in said transmission block is an OFDM transmission unit.

17. The method of claim 1, wherein transmitting the first and second sets of information using transmission units included in said first and second sets of transmission units includes transmitting at least one symbol on a transmission unit.

18. The method of claim 17, wherein said transmission unit is an OFDM symbol transmission unit.

19. The method of claim 1, wherein said transmission units are minimum units of transmission resources, each of said transmission units in said transmission block being a different minimum set of transmission resources.

20. The method of claim 1, wherein each of transmission units in said first and second sets of transmission units have a duration which is the same, at least some of said transmission units in the first set of transmission units corresponding to different time periods.

21. The method of claim 20, wherein each of the first and second sets of transmission units are the same size.

22. The method of claim 21, wherein at least some of the first transmission units correspond to different frequencies.

23. The method of claim 1, wherein transmitting the first and second sets of information using transmission units included in said first and second sets of transmission units includes modulating symbols on transmission units included in said first set of transmission units.

24. The method of claim 1, wherein each transmission unit of said transmission block is a combination of a transmission time period and a transmission frequency, each transmission unit corresponding to a different transmission period and transmission frequency combination.

25. The method of claim 1, wherein each transmission unit of said transmission block is a combination of a transmission time and a transmission frequency, at least some transmission units in said transmission block having the same transmission time, no two transmission units in said transmission block having the same transmission time having the same transmission frequency.

26. A method of communicating at least a first set of information and a second set of information, the method comprising:
defining a first set of transmission units for use in conveying said first set of information, said first set of transmission units including at least a majority of transmission units of a transmission block, said transmission block including a plurality of transmission units, each transmission unit corresponding to a unique combination of resources used for transmission of information, said resources including at least two of time, frequency, phase, and spreading code;
defining a second set of said transmission units for use in conveying said second set of information, said second set of transmission units including less transmission units than the first set, at least some of the transmission units in the first and second sets of transmission units being the same, said transmission units in said second set of transmission units being transmission units in said transmission block;

using at least one transmitter to transmit the first and second sets of information using transmission units included in said first and second sets of transmission units;

wherein using at least one transmitter to transmit the first and second sets of information includes transmitting said second set of information using each transmission unit in said second set of transmission units, and transmitting the first set of information includes transmitting said first set of information using at least some of said first set of transmission units;

wherein said at least some of said first set of transmission units includes transmission units in said second set; and wherein the first and second sets of information are transmitted using at least first and second signals, respectively, and wherein the method further comprises:

combining the first and second signals to form a combined signal prior to using a transmission unit included in said first and second sets of transmission resource units to transmit said combined signal.

27. A method of communicating at least a first set of information and a second set of information, the method comprising:

defining a first set of transmission units for use in conveying said first set of information, said first set of transmission units including at least a majority of transmission units of a transmission block, said transmission block including a plurality of transmission units, each transmission unit corresponding to a unique combination of resources used for transmission of information, said resources including at least two of time, frequency, phase, and spreading code;

defining a second set of said transmission units for use in conveying said second set of information, said second set of transmission units including less transmission units than the first set, at least some of the transmission units in the first and second sets of transmission units being the same, said transmission units in said second set of transmission units being transmission units in said transmission block;

using at least one transmitter to transmit the first and second sets of information using transmission units included in said first and second sets of transmission units;

wherein using at least one transmitter to transmit the first and second sets of information includes using transmission units included in said first set of transmission units to transmit a first signal corresponding to the first set of information and using the transmission units in said second set of transmission units to transmit a second signal corresponding to the second set of information;

wherein said second signal is transmitted at a higher power level than said first signal on a per transmission unit basis; and wherein the method further includes varying the transmission power level of the transmission units used to transmit said second signal.

28. A method of communicating at least a first set of information and a second set of information, the method comprising:

defining a first set of transmission units for use in conveying said first set of information, said first set of transmission units including at least a majority of transmission units of a transmission block, said transmission block including a plurality of transmission units, each transmission unit corresponding to a unique combination of resources used for transmission of information, said resources including at least two of time, frequency, phase, and spreading code;

defining a second set of said transmission units for use in conveying said second set of information, said second set of transmission units including less transmission units than the first set, at least some of the transmission units in the first and second sets of transmission units being the same, said transmission units in said second set of transmission units being transmission units in said transmission block;

using at least one transmitter to transmit the first and second sets of information using transmission units included in said first and second sets of transmission units;

wherein using at least one transmitter to transmit the first and second sets of information includes using transmission units included in said first set of transmission units to transmit a first signal corresponding to the first set of information and using the transmission units in said second set of transmission units to transmit a second signal corresponding to the second set of information;

wherein said second signal is transmitted at a higher power level than said first signal on a per transmission unit basis; and wherein the method further includes varying the transmission power level of the transmission units used to transmit said first signal.

29. An apparatus for communicating at least a first set of information and a second set of information, the apparatus comprising:

a tangible non-transitory memory;

a processor coupled to said tangible non-transitory memory, said processor being configured to:

cause said apparatus to determine a first set of transmission units for use in conveying said first set of information, said first set of transmission units including at least a majority of transmission units of a transmission block, said transmission block including a plurality of transmission units, each transmission unit corresponding to a unique combination of resources used for transmission of information, said resources including at least two of time, frequency, phase, and spreading code, and to determine a second set of said transmission units for use in conveying said second set of information, said second set of transmission units including less transmission units than the first set of transmission units, at least some of the transmission resource units in the first and second sets of transmission units being the same; and cause said apparatus to transmit the first and second sets of information using transmission units included in said first and second sets of transmission units; and wherein said processor is further configured to cause the apparatus, as part of causing said apparatus to transmit the first and second sets of information, to use transmission units included in said first set of transmission units to transmit a first signal corresponding to the first set of information and use transmission units included in said second set of transmission units to transmit a second signal corresponding to the second set of information; and wherein said processor is configured to cause the apparatus to transmit the second signal at a higher power level than said first signal on a per transmission unit basis, said power level at which the transmission units corresponding to the second signal are transmitted being at least 3 dB greater than the power level at which the transmission units corresponding to the first signal are transmitted.

30. The apparatus of claim 29, wherein said information is at least one of user data and control information including at least one of acknowledgement information and assignment information.

31. The apparatus of claim 29, wherein said processor, as part of causing said apparatus to transmit the first and second sets of information, is configured to cause the apparatus to transmit said first and second signals, from a transmitter, used to transmit signals corresponding to both said first and second sets of information.

32. A tangible non-transitory computer readable medium embodying machine executable instructions for controlling a device to communicate at least a first set of information and a second set of information, the tangible non-transitory computer readable medium comprising:
 instructions for causing said device to define a first set of transmission units for use in conveying said first set of information, said first set of transmission units including at least a majority of transmission units of a transmission block, said transmission block including a plurality of transmission units, each transmission unit corresponding to a unique combination of resources used for transmission of information, said resources including at least two of time, frequency, phase, and spreading code;
 instructions for causing said device to define a second set of said transmission units for use in conveying said second set of information, said second set of transmission units including less transmission units than the first set of transmission units, at least some of the transmission units in the first and second sets of transmission units being the same;
 instructions for causing said device to transmit the first and second sets of information using transmission units included in said first and second sets of transmission units, said instructions for causing said device to transmit the first and second sets of information including instructions to use transmission units included in said first set of transmission units to transmit a first signal corresponding to the first set of information, and to use the transmission units in said second set of transmission units to transmit a second signal corresponding to the second set of information; and
 instructions for causing said device to transmit the second signal at a higher power level than said first signal on a per transmission unit basis, said power level at which the transmission units corresponding to the second signal are transmitted being at least 3 dB greater than the power level at which the transmission units corresponding to the first signal are transmitted.

33. The tangible non-transitory computer readable medium of claim 32, wherein said information is at least one of user data and control information including at least one of acknowledgement information and assignment information.

34. The tangible non-transitory computer readable medium of claim 32, wherein the instructions for causing said device to transmit the first and second sets of information, includes instructions for causing said device to transmit signals corresponding to said first and second sets of information from a transmitter used to transmit signals corresponding to both said first and second sets of information.

35. An apparatus for communicating at least a first set of information and a second set of information, the apparatus comprising:
 means for defining a first set of transmission units for use in conveying said first set of information, said first set of transmission units including at least a majority of transmission units of a transmission block, said transmission block including a plurality of transmission units, each transmission unit corresponding to a unique combination of resources used for transmission of information, said resources including at least two of time, frequency, phase, and spreading code;
 means for defining a second set of said transmission units for use in conveying said second set of information, said second set of transmission units including less transmission units than the first set of transmission units, at least some of the transmission units in the first and second sets of transmission units being the same, said transmission units in said second set of transmission units being transmission units in said transmission block;
 means for transmitting the first and second sets of information using minimum transmission units included in said first and second sets of minimum transmission units, said transmitting including:
  using transmission units included in said first set of transmission units to transmit a first signal corresponding to the first set of information, and using the transmission units in said second set of transmission units to transmit a second signal corresponding to the second set of information; and
  transmitting said second signal at a higher power level than said first signal on a per transmission unit basis, said power level at which the transmission units corresponding to the second signal are transmitted being at least 3 dB greater than the power level at which the transmission units corresponding to the first signal are transmitted.

36. The apparatus of claim 35, wherein said information is at least one of user data and control information including at least one of acknowledgement information and assignment information.

37. An apparatus for communicating at least a first set of information and a second set of information, the apparatus comprising:
 a module for defining a first set of transmission units for use in conveying said first set of information, said first set of transmission units including at least a majority of transmission units of a transmission block, said transmission block including a plurality of transmission units, each transmission unit corresponding to a unique combination of resources used for transmission of information, said resources including at least two of time, frequency, phase, and spreading code;
 a module for defining a second set of said transmission units for use in conveying said second set of information, said second set of transmission units including less transmission units than the first set of transmission units, at least some of the transmission units in the first and second sets of transmission units being the same, said transmission units in said second set of transmission units being transmission units in said transmission block;
 a transmitter for transmitting the first and second sets of information using transmission units included in said first and second sets of transmission units;

wherein said transmitter is further configured to transmit the first and second sets of information includes using transmission units included in said first set of transmission units to transmit a first signal corresponding to the first set of information and use the transmission units in said second set of transmission units to transmit a second signal corresponding to the second set of information; and wherein said transmitter is configured to transmit the second signal at a higher power level than said first signal on a per transmission unit basis, said higher power level being at least 3 dB greater than the power level at which the transmission units corresponding to the first signal are transmitted.

38. The apparatus of claim 37, wherein said information is at least one of user data and control information including at least one of acknowledgement information and assignment information.

* * * * *